(12) United States Patent
Yang et al.

(10) Patent No.: US 11,974,305 B2
(45) Date of Patent: Apr. 30, 2024

(54) METHOD FOR TRANSMITTING UPLINK CHANNEL VIA MULTI-BEAMS, TERMINAL DEVICE AND NETWORK-SIDE DEVICE

(71) Applicant: VIVO MOBILE COMMUNICATION CO., LTD., Chang'an Dongguan (CN)

(72) Inventors: Yu Yang, Chang'an Dongguan (CN); Peng Sun, Chang'an Dongguan (CN); Xiaodong Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 502 days.

(21) Appl. No.: 17/157,527

(22) Filed: Jan. 25, 2021

(65) Prior Publication Data
US 2021/0144722 A1 May 13, 2021

Related U.S. Application Data

(63) Continuation of application No. PCT/CN2019/097222, filed on Jul. 23, 2019.

(30) Foreign Application Priority Data

Jul. 25, 2018 (CN) .......................... 201810829855.3

(51) Int. Cl.
*H04W 72/53* (2023.01)
*H04L 25/02* (2006.01)
(Continued)

(52) U.S. Cl.
CPC ......... *H04W 72/53* (2023.01); *H04L 25/0226* (2013.01); *H04W 72/046* (2013.01); *H04W 72/23* (2023.01); *H04W 76/27* (2018.02)

(58) Field of Classification Search
CPC ... H04W 72/53; H04W 72/046; H04W 72/23; H04W 76/27; H04L 25/0226;
(Continued)

(56) References Cited

U.S. PATENT DOCUMENTS

| 2018/0262993 A1* | 9/2018 | Akkarakaran ........ H04W 52/42 |
| 2019/0124538 A1 | 4/2019 | Tang et al. |

(Continued)

FOREIGN PATENT DOCUMENTS

| CN | 107294575 A | 10/2017 |
| CN | 107453795 A | 12/2017 |

(Continued)

OTHER PUBLICATIONS

Huawei, HiSilicon, Robust transmission for UL control channel, 3GPP TSG RAN WG1 Meeting AH NR#3, Nagoya, Japan, Sep. 18-21, 2017, R1-1715721. (Year: 2017).*

(Continued)

*Primary Examiner* — Shailendra Kumar
(74) *Attorney, Agent, or Firm* — von Briesen & Roper, S.C.

(57) ABSTRACT

A method for transmitting an uplink channel via multi-beams, a terminal device and a network-side device are disclosed. The method includes: receiving configuration information, where the configuration information includes a plurality of pieces of uplink beam information for the uplink channel; and the plurality of pieces of uplink beam information has an association relationship with a related parameter of the uplink channel.

20 Claims, 2 Drawing Sheets

(51) Int. Cl.
*H04W 72/044* (2023.01)
*H04W 72/23* (2023.01)
*H04W 76/27* (2018.01)

(58) Field of Classification Search
CPC .. H04B 7/0404; H04B 7/0695; H04B 7/0408; H04B 7/0617; H04B 7/086
See application file for complete search history.

(56) References Cited

U.S. PATENT DOCUMENTS

| | | | |
|---|---|---|---|
| 2019/0199496 A1 | 6/2019 | Qin et al. | |
| 2019/0306850 A1* | 10/2019 | Zhang | H04B 7/0626 |
| 2020/0099491 A1* | 3/2020 | Qin | H04B 7/0695 |
| 2021/0136768 A1* | 5/2021 | Kang | H04L 1/00 |

FOREIGN PATENT DOCUMENTS

| | | |
|---|---|---|
| CN | 108024365 A | 5/2018 |
| CN | 108282863 A | 7/2018 |
| WO | 2013039355 A2 | 3/2013 |
| WO | 2018128365 A1 | 7/2018 |

OTHER PUBLICATIONS

International Search Report & Written Opinion related to Application No. PCT/CN2019/097222; dated Feb. 4, 2021.
Chinese Office Action for related Application No. 201810829855.3; dated Mar. 10, 2021.
Samsung, "Corrections on UL Beam Management", Apr. 16-20, 2018, 3GPP TSG RAN WG1 Meeting #92bis, Sanya, China.
Motorola Mobility, Lenovo, "Remaining Details on non-CA NR UL power control", May 21-25, 2018, 3GPP TSG RAN WG1 #93, Busan, Korea.
Extended European Search Report related to Application No. 19840757.9 dated Aug. 27, 2021.
Asustek: "Discussion on UL Beam Management", 3GPP Draft; R1-1716550 Discussion on UL Beam Management Clean, 3rd Generation Partneship Project (3GPP), Mobile Competence Centre; 650, Route Des Lucioles; F-06921 Sophia-Antipolis Cedex; France; vol. RAN WG1, no. Nagoya, Japan; Sep. 18, 2017-Sep. 21, 2017 Sep. 17, 2017 (Sep. 17, 2017), XP051340003, Retrieved from Internet: URL:http://www.3gpp.org/ftp/Meetings_3GPP_SYNC/RAN1/Docs/ [retrieved on Sep. 17, 2017] sections 1 and 2.
Huawei et al: "Robust transmission for UL control channel", 3GPP Draft; R1-1715721, 3rd Generation Partnership Project (3GPP), Mobile Competence Centre; 650, Route Des Lucioles; F-06921 Sophia-Antipolis Cedex; France, vol. RAN WG1, no. Nagoya, Japan; Sep. 18, 2017-Sep. 21, 2017 Sep. 17, 2017 (Sep. 17, 2017), XP051339183, Retrieved from the Internet : URL:https://www.3gpp.org/ftp/Meetings_3GPP_SYNC/RAN1/Docs/ [retrieved on Sep. 17, 2017] sections 1 and 2.
Vivo: "Discussion on beam indication", 3GPP Draft; R1-1712837_Discussion on Beam Indication, 3rd Generation Partnership Project (3GPP) Mobile Competence Centre; 650, Route Des Lucioles; F-06921 Sophia-Antipolis Cedex; France, Aug. 25, 2017 (Aug. 25, 2017) pp. 1-4, XP051315649, Retrieved from the Internet: URL:https://www.3gpp.org/ftp/Meetings_3GPP_SYNC/RAN1/Docs/ [Retrieved on Aug. 25, 2017] section 2.1.

* cited by examiner

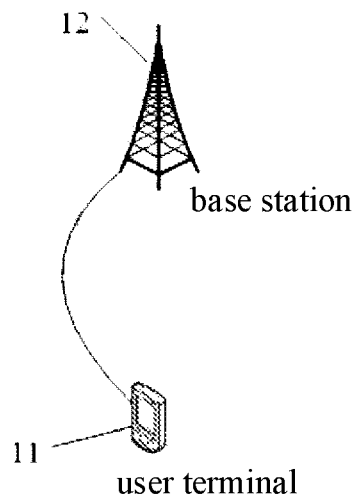

FIG. 1 receiving configuration information, where the configuration information includes a plurality of pieces of uplink beam information for the uplink channel; and the plurality of pieces of uplink beam information has an association relationship with a related parameter of the uplink channel  S210

FIG. 2 transmitting configuration information, where the configuration information includes a plurality of pieces of uplink beam information for the uplink channel; and the plurality of pieces of uplink beam information has an association relationship with a related parameter of the uplink channel  S310

FIG. 3

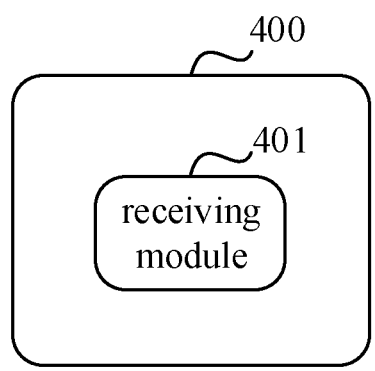

FIG. 4

METHOD FOR TRANSMITTING UPLINK CHANNEL VIA MULTI-BEAMS, TERMINAL DEVICE AND NETWORK-SIDE DEVICE

CROSS-REFERENCE TO RELATED APPLICATION

This application is a continuation application of PCT International Application No. PCT/CN2019/097222 filed on Jul. 23, 2019, which claims a priority to Chinese Patent Application No. 201810829855.3 filed on Jul. 25, 2018, both disclosures of which are incorporated in their entireties by reference herein.

TECHNICAL FIELD

The present disclosure relates to the field of communications, in particular to a method for transmitting an uplink channel via multi-beams, a terminal device and a network-side device.

BACKGROUND

The large-scale antenna technology is introduced to the $5^{th}$ generation 5G) mobile communication new radio (NR) system, which can better support the multi-user multiple-input multiple-output (MU-MIMO) antenna technology. In order to reduce the equipment cost and baseband processing complexity caused by a large-scale antenna array, the digital-analog hybrid beamforming technology is used to achieve a relatively rough match between a transmitted signal and a channel.

However, in the digital-analog hybrid beamforming technology, there is still a lack of schemes transmitting an uplink channel based on multi-beam, resulting in a low uplink transmission efficiency of a communication system.

SUMMARY

In a first aspect, an embodiment of the present disclosure provides a method for transmitting an uplink channel via multi-beams, which is applied to a terminal device. The method includes: receiving configuration information, where the configuration information includes a plurality of pieces of uplink beam information for the uplink channel; and the plurality of pieces of uplink beam information has an association relationship with a related parameter of the uplink channel.

In a second aspect, an embodiment of the present disclosure further provides a method for transmitting an uplink channel via multi-beams, which is applied to a network-side device. The method includes: transmitting configuration information, where the configuration information includes a plurality of pieces of uplink beam information for the uplink channel; and the plurality of pieces of uplink beam information has an association relationship with a related parameter of the uplink channel.

In a third aspect, an embodiment of the present disclosure further provides a terminal device, which includes: a receiving module configured to receive configuration information, where the configuration information includes a plurality of pieces of uplink beam information for the uplink channel; and the plurality of pieces of uplink beam information has an association relationship with a related parameter of the uplink channel.

In a fourth aspect, an embodiment of the present disclosure further provides a terminal device. The terminal device includes a processor, a memory, and a program that is stored on the memory and executable on the processor. The processor is configured to execute the program to implement steps of the method for transmitting the uplink channel via multi-beams as described in the first aspect.

In a fifth aspect, an embodiment of the present disclosure further provides a computer-readable storage medium, on which a program is stored. The program is executed by a processor to implement steps of the method for transmitting the uplink channel via multi-beams as described in the first aspect.

In a sixth aspect, an embodiment of the present disclosure further provides a network-side device, which includes: a transmitting module configured to transmit configuration information, where the configuration information includes a plurality of pieces of uplink beam information for the uplink channel; and the plurality of pieces of uplink beam information has an association relationship with a related parameter of the uplink channel.

In a seventh aspect, an embodiment of the present disclosure further provides a network-side device. The network-side device includes a processor, a memory, and a program that is stored on the memory and executable on the processor. The processor is configured to execute the program to implement steps of the method for transmitting the uplink channel via multi-beams as described in the second aspect.

In an eighth aspect, an embodiment of the present disclosure further provides a computer-readable storage medium, on which a program is stored. The program is executed by a processor to implement steps of the method for transmitting the uplink channel via multi-beams as described in the second aspect.

In the embodiments of the present disclosure, a plurality of pieces of uplink beam information are configured for an uplink channel based on the configuration information, and the plurality of pieces of uplink beam information has an association relationship with a related parameter of the uplink channel, so that the terminal device can use the plurality of pieces of uplink beam information to transmit the uplink channel according to the association relationship. Thus, the uplink transmission efficiency of a communication system can be effectively improved.

BRIEF DESCRIPTION OF THE DRAWINGS

The drawings described herein are used to provide a further understanding of the present disclosure and constitute a part of the present disclosure. Exemplary embodiments of the present disclosure and the description thereof are used to explain the present disclosure, and do not constitute any improper limitation of the present disclosure. In the drawings:

FIG. 1 is a schematic diagram of a network architecture provided by an embodiment of the present disclosure;

FIG. 2 is a schematic flowchart of a method for transmitting an uplink channel via multi-beams provided by an embodiment of the present disclosure;

FIG. 3 is another schematic flowchart of a method for transmitting an uplink channel via multi-beams provided by an embodiment of the present disclosure;

FIG. 4 is a schematic structural diagram of a terminal device provided by an embodiment of the present disclosure;

DETAILED DESCRIPTION

Figure 5:
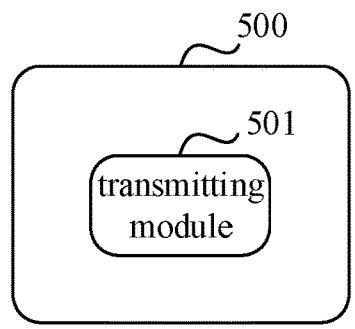
FIG. 5 is a schematic structural diagram of a network-side device provided by an embodiment of the present disclosure.

A technical solution in embodiments of the present disclosure will be described clearly with reference to the accompanying drawings in the embodiments of the present disclosure. Obviously, the described embodiments are part of the embodiments of the present disclosure, not all of the embodiments. Based on the embodiments in the present disclosure, all other embodiments obtained by those of ordinary skill in the art without creative effort shall fall within the protection scope of the present disclosure.

Referring to FIG. 1, FIG. 1 is a schematic diagram of a network architecture provided by an embodiment of the present disclosure. As shown in FIG. 1, it includes a user terminal 11 and a base station 12. The user terminal 11 may be a terminal device (UE, User Equipment), for example, a mobile phone, a tablet personal computer, a laptop computer, a personal digital assistant (PDA), mobile Internet device (MID), wearable device or other terminal-side devices. It should be noted that a specific type of the user terminal 11 is not limited in the embodiments of the present invention. The above-mentioned base station 12 may be a base station of 5G and later versions (for example, gNB, 5G NR NB), or a base station in other communication systems, or referred to as node B. It should be noted that in the embodiments of the present disclosure, the 5G base station is only taken as an example, but a specific type of the base station 12 is not limited.

It should be noted that specific functions of the aforementioned user terminal 11 and base station 12 will be described in detail through the following multiple embodiments.

FIG. 2 is a schematic flowchart of a method for transmitting an uplink channel via multi-beams provided by an embodiment of the present disclosure. The method is applied to a terminal device, and the method may be as follows.

Step 210: receiving configuration information, where the configuration information includes a plurality of pieces of uplink beam information for the uplink channel; and the plurality of pieces of uplink beam information has an association relationship with a related parameter of the uplink channel.

The network-side device configures a plurality of pieces of uplink beam information for the uplink channel for the terminal device.

The detailed description is given below respectively from two aspects that the network-side device configures a plurality of pieces of uplink beam information for a physical uplink shared channel (PUSCH) and configures a plurality of pieces of uplink beam information for a physical uplink control channel (PUCCH).

The first aspect: the network-side device configures a plurality of pieces of uplink beam information for a PUSCH.

In an embodiment of the present disclosure, the receiving configuration information includes: receiving downlink control information (DCI), where the DCI is used to indicate the configuration information.

The network-side device indicates the configuration information to the terminal device by DCI for scheduling PUSCH, and the configuration information is used to configure a plurality of pieces of uplink beam information for the PUSCH.

Specifically, the DCI includes at least one sounding reference signal resource indicator (SRI) signaling field. A manner of the DCI indicating the configuration information includes at least one of the following:

one SRI signaling field indicating a plurality of pieces of resource indication information, where each piece of resource indication information in the plurality of pieces of resource indication information indicates one piece of uplink beam information; and a plurality of SRI signaling fields indicating a plurality of pieces of resource indication information, where each SRI signaling field in the plurality of SRI signaling fields indicates at least one piece of resource indication information, and each piece of resource indication information in the at least one piece of resource indication information indicates one piece of uplink beam information.

The resource indication information includes at least one of the following: channel state information reference signal resource indicator (CRI), synchronization signal block resource indicator (SSBRI), and SRI.

In an embodiment, the DCI includes an SRI signaling field. No matter how large the number of bits in the SRI signaling field is, the SRI signaling field is used in the DCI to indicate a plurality of pieces of resource indication information. Among the plurality of pieces of resource indication information, each piece of resource indication information indicates one piece of uplink beam information.

For example, DCI1 of PUSCH scheduled by the network-side device includes an SRI signaling field, and the number of bits in the SRI signaling field is 3 bits, then the SRI signaling field may have 8 SRI signaling field values (000~111), corresponding to 8 SRI codepoints respectively. The network-side device predetermines a plurality of pieces of resource indication information corresponding to each SRI codepoint: SRI codepoint 000 corresponding to two pieces of resource indication information: CRI1 and CRI2, and SRI codepoint 001 corresponding to two pieces of resource indication information: CRI3 and SSBRI2, etc.

After the terminal device receives DCI1, if the SRI codepoint of the SRI signaling field in DCI1 is 001, the terminal device may determine that the network-side device has configured two pieces of uplink beam information for PUSCH, which are uplink beam information indicated by CRI3 and uplink beam information indicated by SSBRI2.

In another embodiment, the DCI includes an SRI signaling field, the SRI signaling field may be divided into multiple parts, and each part of the multiple parts is used in the DCI to indicate at least one piece resource indication information, where each piece of resource indication information in the at least one piece of resource indication information indicates one piece of uplink beam information.

For example, DCI2 of PUSCH scheduled by the network-side device includes an SRI signaling field, the number of bits in the SRI signaling field is 9 bits, and the network-side device divides the SRI signaling field into three parts: a first part being the first three bits, a second part being the middle three bits, and a third part being the last three bits.

Each of the three parts of the SRI signaling field may have 8 SRI signaling field values (000~111), corresponding to 8 SRI codepoints. The SRI signaling field values of the three parts of the SRI signaling field together form one SRI signaling field of the SRI signaling field, and the one SRI signaling field corresponds to an SRI codepoint.

The network-side device predetermines a plurality of pieces of resource indication information corresponding to each SRI codepoint in each of the three parts of the SRI signaling field.

The first part of the SRI signaling field: SRI codepoint 000 corresponds to two pieces of resource indication information: CRI1 and CRI2, and SRI codepoint 001 corresponds to one piece of resource indication information: SSBRI2, etc.;

the second part of the SRI signaling field: SRI codepoint 100 corresponds to two pieces of resource indication information: CRI3 and CRI4, SRI codepoint 111 corresponds to two pieces of resource indication information: SSBRI1 and SSBRI3, etc.; and the third part of the SRI signaling field: SRI codepoint 101 corresponds to two pieces of resource indication information SRI1 and SRI2, and SRI codepoint 110 corresponds to two pieces of resource indication information: SRI3 and SRI4, etc.

After DCI2 is received by the terminal device, if the SRI codepoint of the SRI signaling field in DCI2 is 001111101, it is determined that the SRI codepoint of the first part of the SRI signaling field is 001, the SRI codepoint of the second part is 111, and the SRI codepoint of the third part is 101.

The terminal device may determine that the network-side device has configured five pieces of uplink beam information for PUSCH, which are: uplink beam information indicated by SSBRI2, uplink beam information indicated by SSBRI1, uplink beam information indicated by SSBRI3, uplink beam information indicated by SRI1, and uplink beam information indicated by SRI2.

In another embodiment, the DCI includes a plurality of SRI signaling fields, and each of the plurality of SRI signaling fields is used in the DCI to indicate at least one piece of resource indication information, where each piece of resource indication information in the at least one piece of resource indication information indicates one piece of uplink beam information.

For example, DCI3 of PUSCH scheduled by the network-side device includes three SRI signaling fields: a first SRI signaling field, a second SRI signaling field, and a third SRI signaling field. The number of bits in each SRI signaling field is 3 bits (that is, 9-bit SRI signaling field is included in DCI3), and each SRI signaling field may have 8 SRI signaling field values (000~111), corresponding to 8 SRI codepoints.

The network-side device predetermines at least one piece of resource indication information corresponding to each SRI codepoint in each SRI signaling field.

In the first SRI signaling field, SRI codepoint 000 corresponds to two pieces of resource indication information: CRI1 and CRI2, and SRI codepoint 001 corresponds to one piece of resource indication information: SRI2, etc.;

in the second SRI signaling field, SRI codepoint 100 corresponds to two pieces of resource indication information: CRI3 and SSBRI1, and SRI codepoint 111 corresponds to two pieces of resource indication information: SRI1 and SSBRI2, etc.;

in the third SRI signaling field, SRI codepoint 101 corresponds to one piece of resource indication information: SRI3, and SRI codepoint 110 corresponds to two pieces of resource indication information: CRI4 and SSBRI3, etc.

After the terminal device receives DCI3, if the SRI codepoint of the first SRI signaling field in DCI3 is 000, the SRI codepoint of the second SRI signaling field is 111, and the SRI codepoint of the third SRI signaling field is 101, the terminal device may determine that the network-side device has configured five pieces of uplink beam information for PUSCH, namely: uplink beam information indicated by CRI1, uplink beam information indicated by CRI2, uplink beam information indicated by SRI1, uplink beam information indicated by SSBRI2, and uplink beam information indicated by SRI3.

In an embodiment of the present disclosure, before receiving the DCI, the method further includes: receiving a radio resource control (RRC) signaling, where the RRC signaling is used to configure spatial relation information (Spatial Relation) of the PUSCH, or to configure the Spatial Relation of a sounding reference signal (SRS) resource.

The network-side device configures the Spatial Relation of the PUSCH or the Spatial Relation of the SRS resource for the terminal device through RRC signaling, and then configures a plurality of pieces of uplink beam information for the PUSCH in the DCI for scheduling PUSCH, where the plurality of pieces of uplink beam information configured for the PUSCH in the DCI are determined according to the Spatial Relation configured for the PUSCH by the RRC signaling, or are determined according to the Spatial Relation configured for the SRS resource by the RRC signaling.

In the embodiment of the present disclosure, a manner where the RRC signaling configures the Spatial Relation of the PUSCH includes at least one of the following:

a manner where the RRC signaling includes one piece of physical uplink shared channel spatial relation information (PUSCH-Spatial Relation Info), and the one piece of PUSCH-Spatial Relation Info includes a plurality of pieces of resource indication information; and a manner where the RRC signaling includes a plurality of pieces of PUSCH-Spatial Relation Info, and each piece of PUSCH-Spatial Relation Info in the plurality of pieces of PUSCH-Spatial Relation Info includes at least one piece of resource indication information.

In an embodiment, the terminal device receives the RRC signaling transmitted by the network-side device, the RRC signaling includes a PUSCH-Spatial Relation Info, and the PUSCH-Spatial Relation Info includes three pieces of resource indication information: CRI1, SRI2, and SSBRI2.

When the network-side device subsequently schedules the PUSCH, the PUSCH-Spatial Relation Info may be indicated by the DCI for scheduling the PUSCH, so as to configure three pieces of uplink beam information for the PUSCH, namely: the uplink beam information indicated by CRI1, the uplink beam information indicated by SRI2 and the uplink beam information indicated by SSBRI2.

In another embodiment, the terminal device receives RRC signaling transmitted by the network-side device, and the RRC signaling includes two pieces of PUSCH-Spatial Relation Info: the first PUSCH-Spatial Relation Info and the second PUSCH-Spatial Relation Info. The first PUSCH-Spatial Relation Info includes two pieces of resource indication information: SRI1 and SSBRI1, and the second PUSCH-Spatial Relation Info includes three pieces of resource indication information: CRI1, SRI2, and SSBRI2.

When the network-side device subsequently schedules the PUSCH, it may indicate the first PUSCH-Spatial Relation Info and the second PUSCH-Spatial Relation Info by the DCI for scheduling the PUSCH, so as to configure five pieces of uplink beam information for the PUSCH, respectively: the uplink indicated by SRI1 Beam information, uplink beam information indicated by SSBRI1, uplink beam information indicated by CRI1, uplink beam information indicated by SRI2, and uplink beam information indicated by SSBRI2.

In the embodiments of the present disclosure, a manner of configuring the Spatial Relation of the SRS resource by the RRC signaling includes at least one of the following:

a manner where the RRC signaling configures one piece of sounding reference signal spatial relation information (SRS-Spatial Relation Info) for each SRS resource, where the one piece of SRS-Spatial Relation Info includes the plurality of pieces of resource indication information; and a manner where the RRC signaling configures a plurality of pieces of SRS-Spatial Relation Info for each SRS resource, where each piece of SRS-Spatial Relation Info in the plurality of pieces of SRS-Spatial Relation Info includes at least one piece of resource indication information.

In an embodiment, the network-side device configures SRS resources for the terminal device. The terminal device receives an RRC signaling transmitted by the network-side device. One piece of SRS-Spatial Relation Info is configured in the RRC signaling for each SRS resource, and the SRS-Spatial Relation Info includes a plurality of pieces of resource indication information.

For example, the network-side device configures SRS-Spatial Relation Info for the first SRS resource through RRC signaling, and the SRS-Spatial Relation Info includes two pieces of resource indication information: CRI1 and CRI2.

When the network-side device subsequently schedules the PUSCH, the first SRS resource may be indicated by the DCI for scheduling the PUSCH, so that two pieces of uplink beam information configured by the network-side device for PUSCH are determined according to the SRS-Spatial Relation Info of the first SRS resource configured for the first SRS resource via the RRC signaling, which are: uplink beam information indicated by CRI1 and uplink beam information indicated by CRI2.

In another embodiment, the network-side device configures SRS resources for the terminal device. The terminal device receives an RRC signaling transmitted by the network-side device. The RRC signaling configures at least one piece of SRS-Spatial Relation Info for each SRS resource, and each piece of SRS-Spatial Relation Info in the at least one piece of SRS-Spatial Relation Info includes at least one piece of resource indication information.

For example, the network-side device configures two pieces of SRS-Spatial Relation Info for the first SRS resource through an RRC signaling: the first SRS-Spatial Relation Info and the second SRS-Spatial Relation Info, where the first SRS-Spatial Relation Info includes two pieces of resource indication information: CRI1 and CRI2, and the second SRS-Spatial Relation Info includes one piece of resource indication information: SRI1.

The RRC signaling configures two SRS-Spatial Relation Info for the second SRS resource: the third SRS-Spatial Relation Info and the fourth SRS-Spatial Relation Info, where the third SRS-Spatial Relation Info includes two pieces of resource indication information: SSBRI1 and SSBRI2, and the fourth SRS-Spatial Relation Info includes two pieces of resource indication information: SRI2 and SRI3.

When the network-side device subsequently schedules a PUSCH, the first SRS resource and the second SRS resource may be indicated by DCI for scheduling the PUSCH, so as to determine seven pieces of uplink beam information that have been configured by the network-side device for the PUSCH, based on the first SRS-Spatial Relation Info and the second SRS-Spatial Relation Info configured for the first SRS resource via the RRC signaling, and the third SRS-Spatial Relation Info and the fourth SRS-Spatial Relation Info configured for the second SRS resource via the RRC signaling. The seven pieces of uplink beam information are the uplink beam information indicated by CRI1, the uplink beam information indicated by CRI2, the uplink beam information indicated by SRI1, the uplink beam information indicated by SSBRI1, the uplink beam information indicated by SSBRI2, the uplink beam information indicated by SRI2, and the uplink beam information indicated by SRI3.

The second aspect: the network-side device configures a plurality of pieces of uplink beam information for a PUCCH.

A method in which the network-side device configures a plurality of pieces of uplink beam information for the PUCCH includes at least two of the following methods.

The first method:

In an embodiment of the present disclosure, the receiving configuration information includes: receiving DCI, where the DCI is used to indicate the configuration information.

The network-side device indicates the configuration information to the terminal device through the DCI, and the configuration information is used to configure a plurality of pieces of uplink beam information for the PUCCH.

Specifically, the DCI includes at least one signaling field; and a manner of the DCI indicating the configuration information includes at least one of the following:

one signaling field indicating one piece of physical uplink control channel spatial relation information (PUCCH-Spatial Relation Info), where the one piece of PUCCH-Spatial Relation Info indicates the plurality of pieces resource indication information, and each piece of resource indication information in the plurality of pieces of resource indication information indicates one piece of uplink beam information;

the at least one signaling field indicating a plurality of pieces of PUCCH-Spatial Relation Info, where each piece of PUCCH-Spatial Relation Info in the plurality of pieces of PUCCH-Spatial Relation Info indicates at least one piece of resource indication information, and each piece of resource indication information in the at least one piece of resource indication information indicates one piece of uplink beam information.

The network-side device configures a plurality of pieces of uplink beam information for PUCCH through DCI.

In an embodiment, the DCI where the network-side device configures a plurality of pieces of uplink beam information for PUCCH includes a signaling field, no matter how large the number of bits in the signaling field is, the signaling field in the DCI is used to indicate one piece of PUCCH-Spatial Relation Info, where the PUCCH-Spatial Relation Info indicates a plurality of pieces of resource indication information, and each piece of resource indication information in the plurality of pieces of resource indication information indicates one piece of uplink beam information.

For example, DCI1 where the network-side device configures a plurality of pieces of uplink beam information for PUCCH includes a signaling field, and the number of bits in the signaling field is 3 bits, then the signaling field may have 8 signaling field values (000~111), corresponding to 8 codepoints (codepoint) respectively. The network-side device predetermines one piece of PUCCH-Spatial Relation Info corresponding to each codepoint, and a plurality of pieces of resource indication information indicated by each piece of PUCCH-Spatial Relation Info. That is, codepoint 000 corresponds to the first PUCCH-Spatial Relation Info, and the first PUCCH-Spatial Relation Info indicates two pieces of resource indication information: CRI1 and CRI2; codepoint 001 corresponds to the second PUCCH-Spatial Relation Info, and the second PUCCH-Spatial Relation Info indicates two pieces of resource indication information: SSBRI1 and SRI1, and so on.

After the terminal device receives DCI1, if the codepoint of the signaling field in DCI1 is 000, the terminal device may determine, according to the first PUCCH-Spatial Relation Info indicated by the DCI, that the network-side device has configured two pieces of uplink beam information for PUCCH, which are respectively: uplink beam information indicated by CRI1 and uplink beam information indicated by CRI2.

In another embodiment, the DCI in which the network-side device configures a plurality of pieces of uplink beam information for PUCCH includes multiple signaling fields. At least one signaling field of the multiple signaling fields is used in the DCI to indicate multiple pieces of PUCCH-Spatial Relation Info. Each piece of PUCCH-Spatial Relation Info in the multiple pieces of PUCCH-Spatial Relation Info indicates at least one piece of resource indication information, and each piece of resource indication information in the at least one piece of resource indication information indicates one uplink beam information.

For example, DCI2 where the network-side device configures a plurality of pieces of uplink beam information for PUCCH includes a signaling field, and the number of bits in the signaling field is 3 bits, then the signaling field may have 8 signaling field values (000~111), corresponding to 8 codepoints. The network-side device predetermines a plurality of pieces of PUCCH-Spatial Relation Info corresponding to each codepoint, and a plurality of pieces of resource indication information indicated by each piece of PUCCH-Spatial Relation Info. That is, codepoint 000 corresponds to the first PUCCH-Spatial Relation Info and the second PUCCH-Spatial Relation Info, where the first PUCCH-Spatial Relation Info indicates resource indication information CRI1, and the second PUCCH-Spatial Relation Info indicates resource indication information CRI2; codepoint 001 corresponds to the third PUCCH-Spatial Relation Info and the fourth PUCCH-Spatial Relation Info, where the third PUCCH-Spatial Relation Info indicates two pieces of resource indication information: SSBRI1 and SRI1, and the fourth PUCCH-Spatial Relation Info indicates two pieces of resource indication information: SSBRI2 and SRI3.

After the terminal device receives DCI2, if the codepoint of the signaling field in DCI2 is 001, the terminal device may determine, based on the third PUCCH-Spatial Relation Info and the fourth PUCCH-Spatial Relation Info indicated by DCI2, that the network-side device has configured four pieces of uplink beam information for the PUCCH. The four pieces of uplink beam information are uplink beam information indicated by SSBRI1, uplink beam information indicated by SRI1, uplink beam information indicated by SSBRI2, and uplink beam information indicated by SRI3.

For example, DCI3 in which the network-side device configures a plurality of pieces of uplink beam information for PUCCH includes two signaling fields: a first signaling field and a second signaling field. The number of bits in each signaling field is 3 bits (that is, DCI3 includes 6-bit signaling fields), and each signaling field may have 8 signaling field values (000~111), corresponding to 8 codepoints.

The network-side device predetermines a plurality of pieces of PUCCH-Spatial Relation Info corresponding to each codepoint in each signaling field, and a plurality of pieces of resource indication information indicated by each piece of PUCCH-Spatial Relation Info in the plurality of pieces of PUCCH-Spatial Relation Info corresponding to each codepoint in each signaling field.

In the first signaling field, codepoint 000 corresponds to two pieces of PUCCH-Spatial Relation Info: the first PUCCH-Spatial Relation Info and the second PUCCH-Spatial Relation Info. The first PUCCH-Spatial Relation Info indicates resource indication information CRI1, the second PUCCH-Spatial Relation Info indicates resource indication information CRI2. Codepoint 001 corresponds to two pieces of PUCCH-Spatial Relation Info: the third PUCCH-Spatial Relation Info and the fourth PUCCH-Spatial Relation Info. The third PUCCH-Spatial Relation Info Indicates two pieces of resource indication information: SSBRI1 and SRI1, and the fourth PUCCH-Spatial Relation Info indicates one piece of resource indication information: SSBRI2, and so on.

In the second signaling field, codepoint 100 corresponds to two pieces of PUCCH-Spatial Relation Info: the fifth PUCCH-Spatial Relation Info and the sixth PUCCH-Spatial Relation Info. The fifth PUCCH-Spatial Relation Info indicates resource indication information CRI3, the second PUCCH-Spatial Relation Info indicates resource indication CRI4. Codepoint 111 corresponds to two pieces of PUCCH-Spatial Relation Info: the seventh PUCCH-Spatial Relation Info and the eighth PUCCH-Spatial Relation Info. The seventh PUCCH-Spatial Relation Info indicates two pieces of resource indication information: SSBRI3 and SRI2, and the eighth PUCCH-Spatial Relation Info indicates one piece of resource indication information: SRI3, and so on.

After the terminal device receives the DCI3, if the codepoint of the first signaling field in DCI3 is 000, and the codepoint of the second signaling field in DCI3 is 111, the terminal device may determine, according to the first PUCCH-Spatial Relation Info, the second PUCCH-Spatial Relation Info, the seventh PUCCH-Spatial Relation Info and the eighth PUCCH-Spatial Relation Info indicated by DCI3, that the network-side device has configured five pieces of uplink beam information for PUCCH. The five pieces of uplink beam information are: the uplink beam information indicated by CRI1, the uplink beam information indicated by CRI2, the uplink beam information indicated by SSBRI3, the uplink beam information indicated by SRI2, and the uplink beam information indicated by SRI3.

The second method:

In an embodiment of the present disclosure, the receiving configuration information includes: receiving a higher-layer signaling, where the higher-layer signaling is used to indicate the configuration information, and the higher-layer signaling includes at least one of the following: RRC signaling, and medium access control control element (MAC CE) signaling.

Specifically, a manner of the higher-layer signaling indicating the configuration information includes at least one of the following:

one piece of PUCCH-Spatial Relation Info indicating a plurality of pieces of resource indication information, where each piece of resource indication information in the plurality of pieces of resource indication information indicates one piece of uplink beam information; and a plurality of pieces of PUCCH-Spatial Relation Info indicating a plurality of pieces of resource indication information, where each piece of PUCCH-Spatial Relation Info in the plurality of pieces of PUCCH-Spatial Relation Info indicates at least one piece of resource indication information, and each piece of resource indication information in the at least one piece of resource indication information indicates one piece of uplink beam information.

The network-side device configures a plurality of pieces of uplink beam information for PUCCH through higher-layer signaling (RRC signaling or MAC CE signaling).

In an embodiment, the terminal device receives an RRC signaling transmitted by the network-side device, and the RRC signaling includes PUCCH-Spatial Relation Info, and the PUCCH-Spatial Relation Info indicates two pieces of resource indication information: SRI1 and SSBRI1. Therefore, the terminal device may determine that the network-side device has configured two pieces of uplink beam information for the PUCCH through the RRC signaling, which are: uplink beam information indicated by SRI1 and uplink beam information indicated by SSBRI1.

In another embodiment, the terminal device receives an RRC signaling transmitted by the network-side device, and the RRC signaling includes two pieces of PUCCH-Spatial Relation Info: the first PUCCH-Spatial Relation Info and the second PUCCH-Spatial Relation Info. The first PUCCH-Spatial Relation Info indicates one piece of resource indication information: SRI1, and the second PUCCH-Spatial Relation Info indicates three pieces of resource indication information: CRI1, SRI2, and SSBRI2. Therefore, the terminal device may determine that the network-side device has configured four pieces of uplink beam information for PUCCH through the RRC signaling, which are: uplink beam information indicated by SRI1, uplink beam information indicated by CRI1, uplink beam information indicated by SRI2, and uplink beam information indicated by SSBRI2.

In an embodiment of the present disclosure, a manner for determining the association relationship between the plurality of pieces of uplink beam information and the related parameter of the uplink channel includes at least one of the following:

defining through a protocol;
configuring by a network-side device; and
determining by the terminal device.

After the network-side device configures the plurality of pieces of uplink beam information of the uplink channel for the terminal device, the terminal device determines the association relationship between the plurality of pieces of uplink beam information and the related parameter of the uplink channel.

It should be noted that the association relationship between the plurality of pieces of uplink beam information and the related parameter of the uplink channel may be specified by a protocol, may be configured by the network-side device, may be determined independently by the terminal device, or may be determined in other ways, which is not specifically limited herein.

The network-side device may configure or indicate the association relationship for the terminal device through higher-layer signaling (RRC signaling, MAC CE signaling), and may also indicate the association relationship for the terminal device through DCI.

It should be noted that the DCI indicating the association relationship and the DCI indicating the configuration information used to configure the plurality of pieces of uplink beam information for the uplink channel may be the same or different, which is not specifically limited herein.

In an embodiment of the present disclosure, the association relationship includes at least one of the following:

a, the plurality of pieces of uplink beam information are associated with different uplink channels;

b, the plurality of pieces of uplink beam information are associated with different transport blocks (TB) in a same uplink channel;

c, the plurality of pieces of uplink beam information are associated with different layers or different antenna ports corresponding to a same uplink channel;

d, the plurality of pieces of uplink beam information are associated with parts of the same uplink channel that are transmitted at different times;

e, the plurality of pieces of uplink beam information are associated with different physical resource block bundles (PRB bundle);

f, the plurality of pieces of uplink beam information are associated with different physical resource blocks PRBs in a same PRB bundle;

g, the plurality of pieces of uplink beam information are associated with different resource allocations corresponding to the uplink channel;

h, the plurality of pieces of uplink beam information are associated with different modulation and coding schemes (MCS) corresponding to the uplink channel;

i, the plurality of pieces of uplink beam information are associated with different numerologies corresponding to the uplink channel;

j, the plurality of pieces of uplink beam information are associated with different carriers or different bandwidth parts (BWP) corresponding to the uplink channel; and k, the plurality of pieces of uplink beam information are associated with each repeated transmission of the uplink channel.

It should be noted that the association relationship between the plurality of pieces of uplink beam information and the related parameter of the uplink channel may include other association relationships in addition to the foregoing a to k, which is not specifically limited herein.

The detailed description is given below respectively from two aspects that the terminal device uses a plurality of pieces of uplink beam information to transmit PUSCH and the terminal device uses a plurality of pieces of uplink beam information to transmit PUCCH.

The first aspect: the terminal device uses a plurality of pieces of uplink beam information to transmit a PUSCH.

In an embodiment of the present disclosure, in a case that the uplink channel is a PUSCH, the association relationship includes at least one of the following:

a, the plurality of pieces of uplink beam information are associated with different PUSCHs scheduled by a same DCI.

The terminal device may determine uplink beam information used by each PUSCH in different PUSCHs scheduled by the same DCI according to the association relationship, and then the terminal device uses the plurality of pieces of uplink beam information to transmit different PUSCHs scheduled by the same DCI.

b, The plurality of pieces of uplink beam information are associated with different TBs in a same PUSCH.

The terminal device may determine uplink beam information used by each TB in the same PUSCH according to the association relationship, and then the terminal device uses the plurality of pieces of uplink beam information to transmit different TBs in the same PUSCH.

c, The plurality of pieces of uplink beam information are associated with different layers or different antenna ports corresponding to a same PUSCH.

The terminal device may determine uplink beam information used by each layer corresponding to the same PUSCH according to the association relationship, and then the terminal device uses the plurality of pieces of uplink beam information to transmit the PUSCH on different layers corresponding to the same PUSCH; or the terminal device may determine uplink beam information used by each antenna port corresponding to the same PUSCH according to the association relationship, and then the terminal device uses the plurality of pieces of uplink beam information to transmit the PUSCH on different antenna ports corresponding to the same PUSCH.

d, The plurality of pieces of uplink beam information are associated with parts of a same PUSCH that are transmitted at different times.

The terminal device may determine the plurality of pieces of uplink beam information used by the parts of the same PUSCH that are transmitted at different times, according to the association relationship, and then the terminal device uses the plurality of pieces of uplink beam information to transmit the parts of the same PUSCH that are transmitted at different times.

g, The plurality of pieces of uplink beam information are associated with different resource allocations corresponding to a PUSCH.

The terminal device may determine the plurality of pieces of uplink beam information used by different resource allocations corresponding to the PUSCH according to the association relationship, and then the terminal device uses the plurality of pieces of uplink beam information to transmit the PUSCH on different resource allocations corresponding to the PUSCH.

h, The plurality of pieces of uplink beam information are associated with different MCSs corresponding to PUSCH.

The terminal device may determine the plurality of pieces of uplink beam information used by different MCSs corresponding to the PUSCH according to the association relationship, and then the terminal device uses the plurality of pieces of uplink beam information and different MCSs to transmit the PUSCH.

i, The plurality of pieces of uplink beam information are associated with different numerologies corresponding to a PUSCH.

The terminal device may determine the plurality of pieces of uplink beam information used by different numerologies corresponding to the PUSCH according to the association relationship, and then the terminal device uses the plurality of pieces of uplink beam information to transmit the PUSCH with different numerologies.

j, The plurality of pieces of uplink beam information are associated with different carriers or different BWPs corresponding to a PUSCH.

The terminal device may determine the plurality of pieces of uplink beam information used by different carriers corresponding to the PUSCH according to the association relationship, and then the terminal device uses the plurality of pieces of uplink beam information to transmit PUSCH on different carriers; or the terminal device may determine the plurality of pieces of uplink beam information used by different BWPs corresponding to the PUSCH according to the association relationship, and then the terminal device uses the plurality of pieces of uplink beam information to transmit PUSCH on different BWPs.

It should be noted that the aforementioned association relationships a, b, c, d, g, h, i and j may be used alone or in combination, which are not specifically limited herein.

In an embodiment of the present disclosure, the method further includes: according to one or more of the association relationships a, b, c, g, h, i, and j, transmitting the PUSCH by using the plurality of pieces of uplink beam information at the same time.

For example, a terminal device simultaneously uses the plurality of pieces of uplink beam information to: transmit different PUSCHs, transmit different TBs in the same PUSCH, transmit a PUSCH on different layers corresponding to the same PUSCH, transmit a PUSCH on different antenna ports corresponding to the same PUSCH, transmit a PUSCH on different resource allocations corresponding to the PUSCH, transmit a PUSCH by using different MCSs, transmit a PUSCH by using different numerologies, transmit a PUSCH on different carriers, or transmit a PUSCH on different BWPs.

In an embodiment of the present disclosure, the method further includes: according to one or more of the association relationships a, b, c, d, g, h, i, and j, transmitting the uplink channel by using the plurality of pieces of uplink beam information in a preset beam usage sequence.

For example, the terminal device successively uses the plurality of pieces of uplink beam information in the preset beam usage sequence to: transmit different PUSCHs, transmit different TBs in the same PUSCH, transmit a PUSCH on different layers corresponding to the same PUSCH, transmit a PUSCH on different antenna ports corresponding to the same PUSCH, transmit different parts of the same PUSCH that are transmitted at different times, transmit a PUSCH on different resource allocations corresponding to the PUSCH, transmit a PUSCH by using different MCSs, transmit a PUSCH by using different numerologies, transmit a PUSCH on different carriers, or transmit a PUSCH on different BWPs.

The second aspect: the terminal device uses a plurality of pieces of uplink beam information to transmit a PUCCH.

In an embodiment of the present disclosure, in a case that the uplink channel is a PUCCH, the association relationship includes at least one of the following:

a, the plurality of pieces of uplink beam information are associated with different PUCCHs.

The terminal device may determine uplink beam information used by each PUCCH in different PUCCHs according to the association relationship, and then the terminal device uses the plurality of pieces of uplink beam information to transmit different PUCCHs.

When a terminal device uses a plurality of pieces of uplink beam information to transmit different PUCCHs, the same uplink control information (UCI) may be transmitted on multiple different PUCCHs.

PUCCHs where the same UCI is transmitted may be determined based on the agreement of a protocol or the indication of the network-side device.

c, The plurality of pieces of uplink beam information are associated with different layers or different antenna ports corresponding to a same PUCCH.

The terminal device may determine a plurality of pieces of uplink beam information used by respective layers corresponding to the same PUCCH according to the association relationship, and then the terminal device uses the plurality of pieces of uplink beam information to transmit the PUCCH on different layers corresponding to the same PUCCH; or, the terminal device may determine a plurality of pieces of uplink beam information used by respective antenna ports corresponding to the same PUCCH according to the association relationship, and then the terminal device uses the plurality of pieces of uplink beam information to transmit the PUCCH on different antenna ports corresponding to the same PUCCH, and the terminal device uses the plurality of pieces of uplink beam information to transmit the PUCCH on different antenna ports corresponding to the same PUCCH.

d, The plurality of pieces of uplink beam information are associated with parts of a same PUCCH that are transmitted at different times.

The terminal device may determine a plurality of pieces of uplink beam information used by the parts of the same PUCCH that are transmitted at different times according to the association relationship, and then the terminal device uses the plurality of pieces of uplink beam information to transmit the parts of the same PUCCH that are transmitted at different times.

e, The plurality of pieces of uplink beam information are associated with different PRB bundles.

In a practical application, all PRBs in a PUCCH are divided into different PRB bundles according to the PRB bundle size defined for the PUCCH, and the PUCCH is transmitted according to the PRB bundles.

The terminal device may determine uplink beam information used by different PRB bundles according to the association relationship, and then the terminal device uses a plurality of pieces of uplink beam information to transmit different PRB bundles.

f, The plurality of pieces of uplink beam information are associated with different PRBs in a same PRB bundle.

The terminal device may determine a plurality of pieces of uplink beam information used by different PRBs in the same PRB bundle according to the association relationship, and then the terminal device uses the plurality of pieces of uplink beam information to transmit different PRBs in the same PRB bundle.

g, The plurality of pieces of uplink beam information are associated with different resource allocations corresponding to a PUCCH.

The terminal device may determine a plurality of pieces of uplink beam information used for different resource allocations corresponding to the PUCCH according to the association relationship, and then the terminal device uses the plurality of pieces of uplink beam information to transmit the PUCCH on different resource allocations corresponding to the PUCCH.

h, The plurality of pieces of uplink beam information are associated with different MCSs corresponding to a PUCCH.

The terminal device may determine a plurality of pieces of uplink beam information used by different MCSs corresponding to the PUCCH according to the association relationship, and then the terminal device uses the plurality of pieces of uplink beam information and different MCSs to transmit the PUCCH.

i, The plurality of pieces of uplink beam information are associated with different numerologies corresponding to a PUCCH.

The terminal device may determine a plurality of pieces of uplink beam information used by different numerologies corresponding to the PUCCH according to the association relationship, and then the terminal device uses the plurality of pieces of uplink beam information to transmit the PUCCH by using different numerologies.

j, The plurality of pieces of uplink beam information are associated with different carriers or different BWPs corresponding to a PUCCH.

The terminal device may determine a plurality of pieces of uplink beam information used by the different carriers corresponding to the PUCCH according to the association relationship, and then the terminal device uses the plurality of pieces of uplink beam information to transmit PUCCH on different carriers; or the terminal device may determine a plurality of pieces of uplink beam information used by the different BWPs corresponding to the PUCCH according to the association relationship, and then the terminal device uses the plurality of pieces of uplink beam information to transmit PUCCH on different BWPs.

k, The plurality of pieces of uplink beam information are associated with each repeated transmission of a PUCCH.

The terminal device may determine uplink beam information used for each repeated transmission of the PUCCH according to the association relationship, and then the terminal device uses different pieces of uplink beam information for respective repeated transmissions of the PUCCH.

It should be noted that the aforementioned association relationships a, c, d, e, f, g, h, i, j, and k may be used alone or in combination, which are not specifically limited herein.

In an embodiments of the present disclosure, the method further includes: according to one or more of the association relationships a, c, e, f, g, h, i, j, and k, transmitting the PUCCH by using the plurality of pieces of uplink beam information at the same time.

For example, a terminal device simultaneously uses the plurality of pieces of uplink beam information to: transmit different PUCCHs, transmit a PUCCH on different layers corresponding to the same PUCCH, transmit a PUCCH on different antenna ports corresponding to the same PUCCH, transmit different PRB bundles, transmit different PRBs in a same PRB bundle, transmit a PUCCH on different resource allocations corresponding to the PUCCH, transmit a PUCCH by using different MCSs, transmit a PUCCH by using different numerologies, transmit a PUCCH on different carriers, transmit a PUCCH on different BWP, or transmit each of repeated transmissions of a PUCCH.

In an embodiment of the present disclosure, the method further includes: according to one or more of the association relationships a, c, d, e, f, g, h, i, j, and k, transmitting the PUCCH by using the plurality of pieces of uplink beam information in a preset beam usage sequence.

For example, the terminal device successively uses the plurality of pieces of uplink beam information in the preset beam usage sequence to: transmit different PUCCHs, transmit a PUCCH on different layers corresponding to the same PUCCH, transmit a PUCCH on different antenna ports corresponding to the same PUCCH, and different parts of the same PUCCH that are transmitted at different times, transmit different PRB bundles, transmit different PRBs in a same PRB bundle, transmit a PUCCH on different resource allocations corresponding to the PUCCH, transmit a PUCCH by using different MCSs, transmit a PUCCH by using different numerologies, transmit a PUCCH on different carriers, transmit a PUCCH on different BWPs, or transmit each of repeated transmissions of a PUCCH.

In an embodiment of the present disclosure, the method further includes: determining a beam switching point.

In a case that a terminal device uses a plurality of pieces of uplink beam information to transmit parts of a same PUSCH that are transmitted at different times, or parts of a same PUCCH that are transmitted at different times, or to transmit a PUSCH or PUCCH according to one or more of the association relationships in the preset beam usage sequence, the terminal device needs to determine the beam switching point first, and then use different pieces of uplink beam information to transmit the PUSCH or PUCCH before and after the beam switching point.

In an embodiment of the present disclosure, the method for determining the beam switching point includes at least one of the following.

The first method includes: determining the beam switching point according to a frequency hopping point that is configured by the network-side device or specified in a protocol.

In an actual application, the network-side device configures frequency hopping information for the terminal device through RRC signaling; or frequency hopping information is specified through the protocol.

The terminal device may determine the frequency hopping point in the frequency hopping information as the beam switching point. That is, before and after the frequency hopping point, different pieces of uplink beam information are used to transmit the PUSCH or PUCCH.

The second method includes: determining at least one beam switching point based on a configuration of the network-side device or a protocol provisions.

The network-side device may configure at least one beam switching point for the terminal device through higher-layer signaling or DCI, or at least one beam switching point is pre-appointed by the network-side device and the terminal device, or at least one beam switching point is specified through a protocol.

The terminal device determines the at least one beam switching point, and then uses different pieces of uplink beam information before and after the beam switching point to transmit the PUSCH or PUCCH.

In an embodiment of the present disclosure, a manner of determining the preset beam usage sequence includes at least one of the following: configuring by a network-side device; defining through a protocol; and determining by the terminal device.

The network-side device indicates the preset beam usage sequence of the plurality of pieces of uplink beam information to the terminal device through higher-layer signaling or DCI, or the protocol specifies the preset beam usage sequence of the plurality of pieces of uplink beam information, or the terminal device independently determines the preset beam usage sequence of the plurality of pieces of uplink beam information according to its own transmission capacity. Subsequently, the terminal device sequentially uses the plurality of pieces of uplink beam information to transmit the PUSCH or PUCCH according to the preset beam usage sequence.

Based on the technical solutions recorded in the embodiments of the present disclosure, a plurality of pieces of uplink beam information are configured for an uplink channel through configuration information, and the plurality of pieces of uplink beam information has an association relationship with a related parameter of the uplink channel, so that the terminal device can use the plurality of pieces of uplink beam information according to the association relationship to transmit the uplink channel, which can effectively improve the uplink transmission efficiency of a communication system.

FIG. 3 is another schematic flowchart of a method for transmitting an uplink channel via multi-beams provided by an embodiment of the present disclosure. The method is applied to a network-side device, and the method may be as follows.

Step 310: transmitting configuration information, where the configuration information includes a plurality of pieces of uplink beam information for the uplink channel; and the plurality of pieces of uplink beam information has an association relationship with a related parameter of the uplink channel.

The network-side device configures a plurality of pieces of uplink beam information of the uplink channel for the terminal device.

The detailed description is given in detail below respectively from two aspects that the network-side device configures a plurality of pieces of uplink beam information for PUSCH and the network-side device configuring a plurality of pieces of uplink beam information for PUCCH.

The first aspect: the network-side device configures a plurality of pieces of uplink beam information for a PUSCH.

In an embodiment of the present disclosure, the transmitting configuration information includes: transmitting DCI, where the DCI is used to indicate the configuration information.

The network-side device indicates the configuration information to the terminal device by DCI for scheduling PUSCH, and the configuration information is used to configure a plurality of pieces of uplink beam information for the PUSCH.

Specifically, the DCI includes at least one SRI signaling field. A manner of the DCI indicating the configuration information includes at least one of the following:

one SRI signaling field indicating a plurality of pieces of resource indication information, where each piece of resource indication information in the plurality of pieces of resource indication information indicates one piece of uplink beam information; and a plurality of SRI signaling fields indicating a plurality of pieces of resource indication information, where each SRI signaling field in the plurality of SRI signaling fields indicates at least one piece of resource indication information, and each piece of resource indication information in the at least one piece of resource indication information indicates one piece of uplink beam information.

The resource indication information includes at least one of the following: CRI, SSBRI, SRI.

In an embodiment, the DCI includes an SRI signaling field. No matter how large the number of bits in the SRI signaling field is, the SRI signaling field is used in the DCI to indicate a plurality of pieces of resource indication information. Among the plurality of pieces of resource indication information, each piece of resource indication information indicates one piece of uplink beam information.

In another embodiment, the DCI includes multiple SRI signaling fields, and the DCI uses each of the multiple SRI signaling fields to indicate at least one piece of resource indication information, where each piece of resource indication information in the at least one piece of resource indication information indicates one piece of uplink beam information.

In an embodiment of the present disclosure, before transmitting DCI, the method further includes: transmitting an RRC signaling, where the RRC signaling is used to configure Spatial Relation of a PUSCH or Spatial Relation of a SRS resource.

The network-side device configures the Spatial Relation of the PUSCH or the Spatial Relation of the SRS resource for the terminal device through the RRC signaling, and then configures a plurality of pieces of uplink beam information for the PUSCH in scheduling the DCI the PUSCH. The plurality of pieces of uplink beam information configured in the DCI for PUSCH are determined according to the Spatial Relation configured for the PUSCH by using the RRC signaling, or are determined according to the Spatial Relation configured for the SRS resource by using the RRC signaling.

In an embodiment of the present disclosure, a manner where the RRC signaling configures the Spatial Relation of the PUSCH includes at least one of the following:

a manner where the RRC signaling includes one piece of PUSCH-Spatial Relation Info, and the one piece of PUSCH-Spatial Relation Info includes a plurality of pieces of resource indication information; and a manner where the RRC signaling includes a plurality of pieces of PUSCH-Spatial Relation Info, and each piece of PUSCH-Spatial Relation Info in the plurality of pieces of PUSCH-Spatial Relation Info includes at least one piece of resource indication information.

A specific process of the network-side device configuring the Spatial Relation of the PUSCH by using the RRC signaling is the same as the relevant part in the above embodiments shown in FIG. 2.

In an embodiment of the present disclosure, a manner of configuring the Spatial Relation of the SRS resource by the RRC signaling includes at least one of the following:

a manner where the RRC signaling configures one piece of SRS-Spatial Relation Info for each SRS resource, where the one piece of SRS-Spatial Relation Info includes the plurality of pieces of resource indication information; and a manner where the RRC signaling configures a plurality of pieces of SRS-Spatial Relation Info for each SRS resource, where each piece of SRS-Spatial Relation Info in the plurality of pieces of SRS-Spatial Relation Info includes at least one piece of resource indication information.

A specific process of the network-side device configuring the Spatial Relation of the SRS resource by using the RRC signaling is the same as the relevant part in the above embodiments shown in FIG. 2.

The second aspect: the network-side device configures a plurality of pieces of uplink beam information for a PUCCH.

A method in which the network-side device configures a plurality of pieces of uplink beam information for the PUCCH includes at least two of the following methods.

The first method:

In an embodiment of the present disclosure, the transmitting configuration information includes: transmitting DCI, where the DCI is used to indicate the configuration information.

The network-side device indicates the configuration information to the terminal device through the DCI, and the configuration information is used to configure a plurality of pieces of uplink beam information for the PUCCH.

Specifically, the DCI includes at least one signaling field; and a manner of the DCI indicating the configuration information includes at least one of the following:

one signaling field indicating one piece of PUCCH-Spatial Relation Info, where the one piece of PUCCH-Spatial Relation Info indicates the plurality of pieces resource indication information, and each piece of resource indication information in the plurality of pieces of resource indication information indicates one piece of uplink beam information;

the at least one signaling field indicating a plurality of pieces of PUCCH-Spatial Relation Info, where each piece of PUCCH-Spatial Relation Info in the plurality of pieces of PUCCH-Spatial Relation Info indicates at least one piece of resource indication information, and each piece of resource indication information in the at least one piece of resource indication information indicates one piece of uplink beam information.

The network-side device configures a plurality of pieces of uplink beam information for PUCCH through DCI.

A specific process of the network-side device configuring the plurality of pieces of uplink beam information for PUCCH through DCI is the same as the relevant part in the above embodiments shown in FIG. 2.

The second method:

In an embodiment of the present disclosure, the transmitting configuration information includes: transmitting a higher-layer signaling, where the higher-layer signaling is used to indicate the configuration information;

The higher-layer signaling includes at least one of the following: RRC signaling and MAC CE signaling.

Specifically, a manner of the higher-layer signaling indicating the configuration information includes at least one of the following:

one piece of PUCCH-Spatial Relation Info indicating a plurality of pieces of resource indication information, where each piece of resource indication information in the plurality of pieces of resource indication information indicates one piece of uplink beam information; and a plurality of pieces of PUCCH-Spatial Relation Info indicating a plurality of pieces of resource indication information, where each piece of PUCCH-Spatial Relation Info in the plurality of pieces of PUCCH-Spatial Relation Info indicates at least one piece of resource indication information, and each piece of resource indication information in the at least one piece of resource indication information indicates one piece of uplink beam information.

The network-side device configures a plurality of pieces of uplink beam information for the PUCCH through higher-layer signaling.

A specific process of the network-side device configuring the plurality of pieces of uplink beam information for PUCCH through higher-layer signaling is the same as the relevant part in the above embodiments shown in FIG. 2.

In an embodiment of the present disclosure, a manner for determining the association relationship between the plurality of pieces of uplink beam information and the related parameter of the uplink channel includes at least one of the following:

defining through a protocol;
configuring by a network-side device; and
determining by the terminal device.

After the network-side device configures the plurality of pieces of uplink beam information of the uplink channel for the terminal device, the network-side device determines the association relationship between the plurality of pieces of uplink beam information and the related parameter of the uplink channel.

It should be noted that the association relationship between the plurality of pieces of uplink beam information and the related parameter of the uplink channel may be specified by a protocol, may be configured by the network-side device, may be determined independently by the terminal device, or may be determined in other ways, which is not specifically limited herein.

The network-side device may configure or indicate the association relationship for the terminal device through higher-layer signaling (RRC signaling, MAC CE signaling), and may also indicate the association relationship for the terminal device through DCI.

It should be noted that the DCI indicating the association relationship may be the same as or different form the DCI indicating the configuration information used to configure the plurality of pieces of uplink beam information for the uplink channel, which is not specifically limited herein.

In an embodiment of the present disclosure, the association relationship includes at least one of the following:

a, the plurality of pieces of uplink beam information are associated with different uplink channels;

b, the plurality of pieces of uplink beam information are associated with different TBs in a same uplink channel;

c, the plurality of pieces of uplink beam information are associated with different layers or different antenna ports corresponding to a same uplink channel;

d, the plurality of pieces of uplink beam information are associated with parts of the same uplink channel that are transmitted at different times;

e, the plurality of pieces of uplink beam information are associated with different PRB bundles;

f, the plurality of pieces of uplink beam information are associated with different PRBs in a same PRB bundle;

g, the plurality of pieces of uplink beam information are associated with different resource allocations corresponding to the uplink channel;

h, the plurality of pieces of uplink beam information are associated with different MCSs corresponding to the uplink channel;

i, the plurality of pieces of uplink beam information are associated with different numerologies corresponding to the uplink channel;

j, the plurality of pieces of uplink beam information are associated with different carriers or different bandwidth parts (BWP) corresponding to the uplink channel; and k, the plurality of pieces of uplink beam information are associated with each of repeated transmissions of the uplink channel.

It should be noted that the association relationship between the plurality of pieces of uplink beam information and the related parameter of the uplink channel may include other association relationships in addition to the foregoing a to k, which is not specifically limited herein.

The detailed description is given below respectively from two aspects that the terminal device uses a plurality of pieces of uplink beam information to transmit PUSCH and the terminal device uses a plurality of pieces of uplink beam information to transmit PUCCH.

The first aspect: the terminal device uses a plurality of pieces of uplink beam information to transmit a PUSCH.

In an embodiment of the present disclosure, in a case that the uplink channel is a PUSCH, the association relationship includes at least one of the following:

a, the plurality of pieces of uplink beam information are associated with different PUSCHs scheduled by a same DCI.

The network-side device uses the plurality of pieces of uplink beam information to receive different PUSCHs scheduled by the same DCI.

b, The plurality of pieces of uplink beam information are associated with different TBs in a same PUSCH.

The network-side device uses the plurality of pieces of uplink beam information to receive different TBs in the same PUSCH.

c, The plurality of pieces of uplink beam information are associated with different layers or different antenna ports corresponding to a same PUSCH.

The network-side device uses the plurality of pieces of uplink beam information to receive the PUSCH on different layers corresponding to the same PUSCH; or, the network-side device uses the plurality of pieces of uplink beam information to receive the PUSCH on different antenna ports corresponding to the same PUSCH.

d. The plurality of pieces of uplink beam information are associated with parts of a same PUSCH that are transmitted at different times.

The network-side device uses the plurality of pieces of uplink beam information to receive the parts of the same PUSCH transmitted at different times.

g, The plurality of pieces of uplink beam information are associated with different resource allocations corresponding to a PUSCH.

The network-side device uses the plurality of pieces of uplink beam information to receive the PUSCH on different resource allocations corresponding to the PUSCH.

h, The plurality of pieces of uplink beam information are associated with different MCSs corresponding to a PUSCH.

The network-side device uses the plurality of pieces of uplink beam information to receive the PUSCH by using different MCSs.

i, The plurality of pieces of uplink beam information are associated with different numerologies corresponding to a PUSCH.

The network-side device uses the plurality of pieces of uplink beam information to receive the PUSCH by using different numerologies.

j, The plurality of pieces of uplink beam information are associated with different carriers or different BWPs corresponding to a PUSCH.

The network-side device uses the plurality of pieces of uplink beam information to receive the PUSCH on different carriers; or, the network-side device uses the plurality of pieces of uplink beam information to receive PUSCH on different BWPs.

It should be noted that the aforementioned association relationships a, b, c, d, g, h, i, and j may be used alone or in combination, which are not specifically limited herein.

In an embodiment of the present disclosure, the method further includes: according to one or more of the association relationships a, b, c, g, h, i, and j, receiving the PUSCH simultaneously by using the plurality of pieces of uplink beam information.

For example, the network-side device simultaneously uses the plurality of pieces of uplink beam information: to receive different PUSCHs, to receive different TBs in the same PUSCH, to receive a PUSCH on different layers corresponding to the same PUSCH, to receive a PUSCH on different antenna ports corresponding to the same PUSCH, to receive a PUSCH on different antenna ports corresponding to the same PUSCH, to receive a PUSCH on different resource allocations corresponding to the PUSCH, to receive a PUSCH by using different MCSs, to receive a PUSCH by using different numerologies, to receive a PUSCH on different carriers, or to receive a PUSCH on different BWPs.

In an embodiment of the present disclosure, the method further includes: according to one or more of the association relationships a, b, c, d, g, h, i, and j, receiving the PUSCH by using a plurality of pieces of uplink beam information according to a preset beam usage sequence.

For example, the network-side device successively uses the plurality of pieces of uplink beam information in the preset beam usage sequence, so as to: receive different PUSCHs, receive different TBs in the same PUSCH, receive a PUSCH on different layers corresponding to the same PUSCH, receive a PUSCH on different antenna ports corresponding to the same PUSCH, receive different parts of the same PUSCH that are transmitted at different times, receive a PUSCH on different resource allocations corresponding to the PUSCH, receive a PUSCH by using different MCSs, receive a PUSCH by using different numerologies, receive a PUSCH on different carriers, or receive a PUSCH on different BWPs.

The second aspect: the network-side device uses a plurality of pieces of uplink beam information to receive a PUCCH.

In an embodiment of the present disclosure, in a case that the uplink channel is a PUCCH, the association relationship includes at least one of the following:

a, the plurality of pieces of uplink beam information are associated with different PUCCHs.

The network-side device uses the plurality of pieces of uplink beam information to receive different PUCCHs.

When the network-side device uses a plurality of pieces of uplink beam information to receive different PUCCHs, the network-side device may receive a same UCI on multiple different PUCCHs.

The PUCCHs where the same UCI is received may be determined based on the agreement of a protocol or the indication of the network-side device.

c, The plurality of pieces of uplink beam information are associated with different layers or different antenna ports corresponding to a same PUCCH.

The network-side device uses the plurality of pieces of uplink beam information to receive a PUCCH on different layers corresponding to the same PUCCH; or, the network-side device uses the plurality of pieces of uplink beam information to receive a PUCCH on different antenna ports corresponding to the same PUCCH.

d, The plurality of pieces of uplink beam information are associated with parts of a same PUCCH that are transmitted at different times.

The network-side device uses the plurality of pieces of uplink beam information to receive the parts of the same PUCCH that are transmitted at different times.

e, The plurality of pieces of uplink beam information are associated with different PRB bundles.

The network-side device uses the plurality of pieces of uplink beam information to receive different PRB bundles.

f, The plurality of pieces of uplink beam information are associated with different PRBs in a same PRB bundle.

The network-side device uses the plurality of pieces of uplink beam information to receive different PRBs in the same PRB bundle.

g, The plurality of pieces of uplink beam information are associated with different resource allocations corresponding to a PUCCH.

The network-side device uses the plurality of pieces of uplink beam information to receive the PUCCH on different resource allocations corresponding to the PUCCH.

h, The plurality of pieces of uplink beam information are associated with different MCSs corresponding to a PUCCH.

The network-side device uses the plurality of pieces of uplink beam information to receive the PUCCH by using different MCSs.

i, The plurality of pieces of uplink beam information are associated with different numerologies corresponding to a PUCCH.

The network-side device uses the plurality of pieces of uplink beam information to receive the PUCCH with different numerologies.

j, The plurality of pieces of uplink beam information are associated with different carriers or different BWPs corresponding to a PUCCH.

The network-side device uses the plurality of pieces of uplink beam information to receive the PUCCH on different carriers; or, the network-side device uses the plurality of pieces of uplink beam information to receive the PUCCH on different BWPs.

k, The plurality of pieces of uplink beam information are associated with each repeated transmission of a PUCCH.

The network-side device uses different pieces of uplink beam information to receive respective repeated transmissions of the PUCCH.

It should be noted that the aforementioned association relationships a, c, d, e, f, g, h, i, j, and k may be used alone or in combination, which are not specifically limited herein.

In an embodiments of the present disclosure, the method further includes: according to one or more of the association relationships a, c, e, f, g, h, i, j, and k, receiving the PUCCH by simultaneously using the plurality of pieces of uplink beam information.

For example, the network-side device simultaneously uses the plurality of pieces of uplink beam information to: receive different PUCCHs, receive a PUCCH on different layers corresponding to the same PUCCH, receive a PUCCH on different antenna ports corresponding to the same PUCCH, receive different PRB bundles, receive different PRBs in a same PRB bundle, receive a PUCCH on different resource allocations corresponding to the PUCCH, receive a PUCCH by using different MCSs, receive a PUCCH by using different numerologies, receive a PUCCH on different carriers, receive a PUCCH on different BWP, or receive respective repeated transmissions of a PUCCH.

In an embodiment of the present disclosure, the method further includes: according to one or more of the association relationships a, c, d, e, f, g, h, i, j, and k, receiving the PUCCH by using the plurality of pieces of uplink beam information in a preset beam usage sequence.

For example, the terminal device successively uses the plurality of pieces of uplink beam information in the preset beam usage sequence to: receive different PUCCHs, receive a PUCCH on different layers corresponding to the same PUCCH, receive a PUCCH on different antenna ports corresponding to the same PUCCH, and different parts of the same PUCCH that are transmitted at different times, receive different PRB bundles, receive different PRBs in a same PRB bundle, receive a PUCCH on different resource allocations corresponding to the PUCCH, receive a PUCCH by using different MCSs, receive a PUCCH by using different numerologies, receive a PUCCH on different carriers, receive a PUCCH on different BWPs, or receive each of repeated transmissions of a PUCCH.

In an embodiment of the present disclosure, the method further includes: determining a beam switching point.

In a case that a terminal device uses a plurality of pieces of uplink beam information to transmit parts of a same PUSCH that are transmitted at different times, or parts of a same PUCCH that are transmitted at different times, or to transmit a PUSCH or PUCCH according to one or more of the association relationships in the preset beam usage sequence, the terminal device needs to determine the beam switching point first, and then use different pieces of uplink beam information to transmit the PUSCH or PUCCH before and after the beam switching point.

In an embodiment of the present disclosure, the method further includes: determining a beam switching point.

In a case that a network-side device uses a plurality of pieces of uplink beam information to transmit parts of a same PUSCH that are transmitted at different times, or parts of a same PUCCH that are transmitted at different times, or to transmit a PUSCH or PUCCH according to one or more of the association relationships in the preset beam usage sequence, the network-side device needs to determine the beam switching point first, and then use different pieces of uplink beam information to transmit the PUSCH or PUCCH before and after the beam switching point.

In an embodiment of the present disclosure, the method for determining the beam switching point includes at least one of the following.

The first method includes: determining the beam switching point according to a frequency hopping point that is configured by the network-side device or specified in a protocol.

In an actual application, the network-side device configures frequency hopping information for the terminal device through RRC signaling; or frequency hopping information is specified through the protocol.

The network-side device may determine the frequency hopping point in the frequency hopping information as the beam switching point. That is, before and after the frequency hopping point, different pieces of uplink beam information are used to transmit the PUSCH or PUCCH.

The second method includes: determining at least one beam switching point based on a configuration of the network-side device or a protocol provisions.

The network-side device may configure at least one beam switching point for the terminal device through higher-layer signaling or DCI, or at least one beam switching point is pre-appointed by the network-side device and the terminal device, or at least one beam switching point is specified through a protocol.

The network-side device uses different pieces of uplink beam information before and after the beam switching point to transmit the PUSCH or PUCCH.

In an embodiment of the present disclosure, a manner of determining the preset beam usage sequence includes at least one of the following: configuring by a network-side device; defining through a protocol; and determining by the terminal device.

The network-side device indicates the preset beam usage sequence of the plurality of pieces of uplink beam information to the terminal device through higher-layer signaling or DCI, or the protocol specifies the preset beam usage sequence of the plurality of pieces of uplink beam information, or the terminal device independently determines the preset beam usage sequence of the plurality of pieces of uplink beam information according to its own transmission capacity. In such a manner, the network-side device sequentially uses the plurality of pieces of uplink beam information to transmit the PUSCH or PUCCH according to the preset beam usage sequence.

Based on the technical solutions recorded in the embodiments of the present disclosure, a plurality of pieces of uplink beam information are configured for an uplink channel through configuration information, and the plurality of pieces of uplink beam information has an association relationship with a related parameter of the uplink channel, so that the terminal device can use the plurality of pieces of uplink beam information to transmit the uplink channel according to the association relationship, which can effectively improve the uplink transmission efficiency of a communication system.

FIG. 4 is a schematic structural diagram of a terminal device provided by an embodiment of the present disclosure. The terminal device 400 shown in FIG. 4 includes: a receiving module 401 is configured to receive configuration information, where the configuration information includes a plurality of pieces of uplink beam information for the uplink channel; and the plurality of pieces of uplink beam information has an association relationship with a related parameter of the uplink channel.

Optionally, the receiving module 401 is further configured to: receive DCI, where the DCI is used to indicate configuration information.

Optionally, the uplink channel is a PUSCH, and the DCI includes at least one SRI signaling field. A manner of the DCI indicating the configuration information includes at least one of the following:

one SRI signaling field indicating a plurality of pieces of resource indication information, where each piece of resource indication information in the plurality of pieces of resource indication information indicates one piece of uplink beam information; and a plurality of SRI signaling fields indicating a plurality of pieces of resource indication information, where each SRI signaling field in the plurality of SRI signaling fields indicates at least one piece of resource indication information, and each piece of resource indication information in the at least one piece of resource indication information indicates one piece of uplink beam information.

Optionally, the receiving module 401 is further configured to: receive an RRC signaling, where the RRC signaling is used to configure Spatial Relation of a PUSCH or Spatial Relation of a SRS resource.

Optionally, a manner where the RRC signaling configures the Spatial Relation of the PUSCH includes at least one of the following:

a manner where the RRC signaling includes one piece of PUSCH-Spatial Relation Info, and the one piece of PUSCH-Spatial Relation Info includes the plurality of pieces of resource indication information; and a manner where the RRC signaling includes a plurality of pieces of PUSCH-Spatial Relation Info, and each piece of PUSCH-Spatial Relation Info in the plurality of pieces of PUSCH-Spatial Relation Info includes at least one piece of resource indication information.

Optionally, a manner where the RRC signaling configures the Spatial Relation of the SRS resource includes at least one of the following:

a manner where the RRC signaling configures one piece of SRS-Spatial Relation Info for each SRS resource, where the one piece of SRS-Spatial Relation Info includes the plurality of pieces of resource indication information; and a manner where the RRC signaling configures a plurality of pieces of SRS-Spatial Relation Info for each SRS resource, where each piece of SRS-Spatial Relation Info in the plurality of pieces of SRS-Spatial Relation Info includes at least one piece of resource indication information.

Optionally, the uplink channel is a PUCCH, and the DCI includes at least one signaling field; a manner of the DCI indicating the configuration information includes at least one of the following:

one signaling field indicating one piece of PUCCH-Spatial Relation Info, where the one piece of PUCCH-Spatial Relation Info indicates the plurality of pieces resource indication information, and each piece of resource indication information in the plurality of pieces of resource indication information indicates one piece of uplink beam information;

the at least one signaling field indicating a plurality of pieces of PUCCH-Spatial Relation Info, where each piece of PUCCH-Spatial Relation Info in the plurality of pieces of PUCCH-Spatial Relation Info indicates at least one piece of resource indication information, and each piece of resource indication information in the at least one piece of resource indication information indicates one piece of uplink beam information.

Optionally, the uplink channel is a PUCCH; the receiving module 401 is further configured to: receive a higher-layer signaling, where the higher-layer signaling is used to indicate the configuration information, and the higher-layer signaling includes at least one of the following: RRC signaling, MAC CE signaling.

Optionally, a manner of the higher-layer signaling indicating the configuration information includes at least one of the following:

one piece of PUCCH-Spatial Relation Info indicating a plurality of pieces of resource indication information, where each piece of resource indication information in the plurality of pieces of resource indication information indicates one piece of uplink beam information; and a plurality of pieces of PUCCH-Spatial Relation Info indicating a plurality of pieces of resource indication information, where each piece of PUCCH-Spatial Relation Info in the plurality of pieces of PUCCH-Spatial Relation Info indicates at least one piece of resource indication information, and each piece of resource indication information in the at least one piece of resource indication information indicates one piece of uplink beam information.

Optionally, the resource indication information includes at least one of the following: CRI, SSBRI, SRI.

Optionally, a manner for determining the association relationship between the plurality of pieces of uplink beam information and the related parameter of the uplink channel includes at least one of the following:

defining through a protocol;
configuring by a network-side device; and
determining by the terminal device 400.

Optionally, the association relationship includes at least one of the following:

a, the plurality of pieces of uplink beam information are associated with different uplink channels;

b, the plurality of pieces of uplink beam information are associated with different TBs in a same uplink channel;

c, the plurality of pieces of uplink beam information are associated with different layers or different antenna ports corresponding to a same uplink channel;

d, the plurality of pieces of uplink beam information are associated with parts of the same uplink channel that are transmitted at different times;

e, the plurality of pieces of uplink beam information are associated with different PRB bundles;

f, the plurality of pieces of uplink beam information are associated with different physical resource blocks PRBs in a same PRB bundle;

g, the plurality of pieces of uplink beam information are associated with different resource allocations corresponding to the uplink channel;

h, the plurality of pieces of uplink beam information are associated with different MCSs corresponding to the uplink channel;

i, the plurality of pieces of uplink beam information are associated with different numerologies corresponding to the uplink channel;

j, the plurality of pieces of uplink beam information are associated with different carriers or different BWPs corresponding to the uplink channel; and k, the plurality of pieces of uplink beam information are associated with each repeated transmission of the uplink channel.

Optionally, in a case that the uplink channel is PUSCH, the association relationship includes at least one of the following: a, b, c, d, g, h, i, and j; and in a case that the uplink channel is PUCCH, the association relationship includes at least one of the following: a, c, d, e, f, g, h, j, and k.

Optionally, the terminal device 400 further includes a first transmitting module configured to: according to one or more of the association relationships a, b, c, e, f, g, h, i, j, and k, transmit the uplink channel by simultaneously using the plurality of pieces of uplink beam information.

Optionally, the terminal device 400 further includes a second transmitting module configured to: transmit, according to one or more of the association relationships a, b, c, d, e, f, g, h, i, j, and k, the uplink channel by using the plurality of pieces of uplink beam information in a preset beam usage sequence.

It should be noted that the first transmitting module and the second transmitting module may be the same hardware transmitting module with a transmitting function, or may be different software transmitting modules with a transmitting function, which are not specifically limited herein.

Optionally, the terminal device 400 further includes: a determining module configured to determine a beam switching point.

Optionally, the determining module is further configured to: determine the beam switching point according to a frequency hopping point that is configured by the network-side device or specified in a protocol.

Optionally, the determining module is further configured to: determine at least one beam switching point based on a configuration of the network-side device or a protocol provision.

Optionally, a manner of determining the preset beam usage sequence includes at least one of the following:

configuring by a network-side device;
defining through a protocol; and
determining by the terminal device 400.

The terminal device 400 provided by the embodiments of the present disclosure may implement each of processes implemented by the terminal device in the method embodiments of FIG. 2, and to avoid repetition, details are not described herein again.

FIG. 5 is a schematic structural diagram of a network-side device provided by an embodiment of the present disclosure. The network-side device 500 shown in FIG. 5 includes: a transmitting module 501 configured to transmit configuration information, where the configuration information includes a plurality of pieces of uplink beam information for the uplink channel; and the plurality of pieces of uplink beam information has an association relationship with a related parameter of the uplink channel.

Optionally, the transmitting module 501 is further configured to: transmit DCI, where the DCI is used to indicate the configuration information.

Optionally, the uplink channel is a PUSCH, and the DCI includes at least one SRI signaling field; a manner of the DCI indicating the configuration information includes at least one of the following:

one SRI signaling field indicating a plurality of pieces of resource indication information, where each piece of resource indication information in the plurality of pieces of resource indication information indicates one piece of uplink beam information; and a plurality of SRI signaling fields indicating a plurality of pieces of resource indication information, where each SRI signaling field in the plurality of SRI signaling fields indicates at least one piece of resource indication information, and each piece of resource indication information in the at least one piece of resource indication information indicates one piece of uplink beam information.

Optionally, the transmitting module 501 is further configured to: transmit an RRC signaling, where the RRC signaling is used to configure Spatial Relation of a PUSCH or Spatial Relation of a SRS resource.

Optionally, a manner where the RRC signaling configures the Spatial Relation of the PUSCH includes at least one of the following:

a manner where the RRC signaling includes one piece of PUSCH-Spatial Relation Info, and the one piece of PUSCH- Spatial Relation Info includes the plurality of pieces of resource indication information; and a manner where the RRC signaling includes a plurality of pieces of PUSCH-Spatial Relation Info, and each piece of PUSCH-Spatial Relation Info in the plurality of pieces of PUSCH-Spatial Relation Info includes at least one piece of resource indication information.

Optionally, a manner where the RRC signaling configures the Spatial Relation of the SRS resource includes at least one of the following:

a manner where the RRC signaling configures one piece of SRS-Spatial Relation Info for each SRS resource, where the one piece of SRS-Spatial Relation Info includes the plurality of pieces of resource indication information; and a manner where the RRC signaling configures a plurality of pieces of SRS-Spatial Relation Info for each SRS resource, where each piece of SRS-Spatial Relation Info in the plurality of pieces of SRS-Spatial Relation Info includes at least one piece of resource indication information.

Optionally, the uplink channel is a PUCCH, and the DCI includes at least one signaling field; a manner of the DCI indicating the configuration information includes at least one of the following:

one signaling field indicating one piece of PUCCH-Spatial Relation Info, where the one piece of PUCCH-Spatial Relation Info indicates the plurality of pieces resource indication information, and each piece of resource indication information in the plurality of pieces of resource indication information indicates one piece of uplink beam information;

the at least one signaling field indicating a plurality of pieces of PUCCH-Spatial Relation Info, where each piece of PUCCH-Spatial Relation Info in the plurality of pieces of PUCCH-Spatial Relation Info indicates at least one piece of resource indication information, and each piece of resource indication information in the at least one piece of resource indication information indicates one piece of uplink beam information.

Optionally, the uplink channel is a PUCCH; the transmitting module 501 is further configured to: transmit a higher-layer signaling, where the higher-layer signaling is used to indicate the configuration information, and the higher-layer signaling includes at least one of the following: RRC signaling and MAC CE signaling.

Optionally, a manner of the higher-layer signaling indicating the configuration information includes at least one of the following:

one piece of PUCCH-Spatial Relation Info indicating a plurality of pieces of resource indication information, where each piece of resource indication information in the plurality of pieces of resource indication information indicates one piece of uplink beam information; and a plurality of pieces of PUCCH-Spatial Relation Info indicating a plurality of pieces of resource indication information, where each piece of PUCCH-Spatial Relation Info in the plurality of pieces of PUCCH-Spatial Relation Info indicates at least one piece of resource indication information, and each piece of resource indication information in the at least one piece of resource indication information indicates one piece of uplink beam information.

Optionally, the resource indication information includes at least one of the following: CRI, SSBRI, SRI.

Optionally, a manner for determining the association relationship between the plurality of pieces of uplink beam information and the related parameter of the uplink channel includes at least one of the following:

defining through a protocol;

configuring by a network-side device 500; and determining by the terminal device.

Optionally, the association relationship includes at least one of the following:

a, the plurality of pieces of uplink beam information are associated with different uplink channels;

b, the plurality of pieces of uplink beam information are associated with different TBs in a same uplink channel;

c, the plurality of pieces of uplink beam information are associated with different layers or different antenna ports corresponding to a same uplink channel;

d, the plurality of pieces of uplink beam information are associated with parts of the same uplink channel that are transmitted at different times;

e, the plurality of pieces of uplink beam information are associated with different PRB bundles;

f, the plurality of pieces of uplink beam information are associated with different PRBs in a same PRB bundle;

g, the plurality of pieces of uplink beam information are associated with different resource allocations corresponding to the uplink channel;

h, the plurality of pieces of uplink beam information are associated with different MCSs corresponding to the uplink channel;

i, the plurality of pieces of uplink beam information are associated with different numerologies corresponding to the uplink channel;

j, the plurality of pieces of uplink beam information are associated with different carriers or different bandwidth parts (BWP) corresponding to the uplink channel; and k, the plurality of pieces of uplink beam information are associated with each of repeated transmissions of the uplink channel.

Optionally, when the uplink channel is a PUSCH, the association relationship includes at least one of the following: a, b, c, d, g, h, i, j; and when the uplink channel is a PUCCH, the association relationship includes at least one of the following: a, c, d, e, f, g, h, i, j, k.

Optionally, the network-side device further includes: a first receiving module configured to receive, according to one or more of the association relationships a, b, c, e, f, g, h, j, and k, the uplink channel by simultaneously using the plurality of pieces of uplink beam information.

Optionally, the network-side device further includes: a second receiving module configured to receive, according to one or more of the association relationships a, b, c, d, e, f, g, h, i, j, and k, the uplink channel by using the plurality of pieces of uplink beam information in a preset beam usage sequence.

It should be noted that the first receiving module and the second receiving module may be the same hardware receiving module with a receiving function, or may be different software receiving modules with a receiving function, which are not specifically limited herein.

Optionally, the terminal device 500 further includes: a determining module configured to determine a beam switching point.

Optionally, the determining module is further configured to: determine the beam switching point according to a frequency hopping point that is configured by the network-side device 500 or specified in the protocol.

Optionally, the determining module is further configured to: determine at least one beam switching point based on a configuration of the network-side device 500 or a protocol provision.

Optionally, a manner of determining the preset beam usage sequence includes at least one of the following:
configuring by a network-side device;
defining through a protocol; and
determining by the terminal device.

The network-side device 500 provided by the embodiments of the present disclosure can implement each of processes implemented by the network-side device in the method embodiments of FIG. 3, and to avoid repetition, details are not described herein again.

Figure 6:
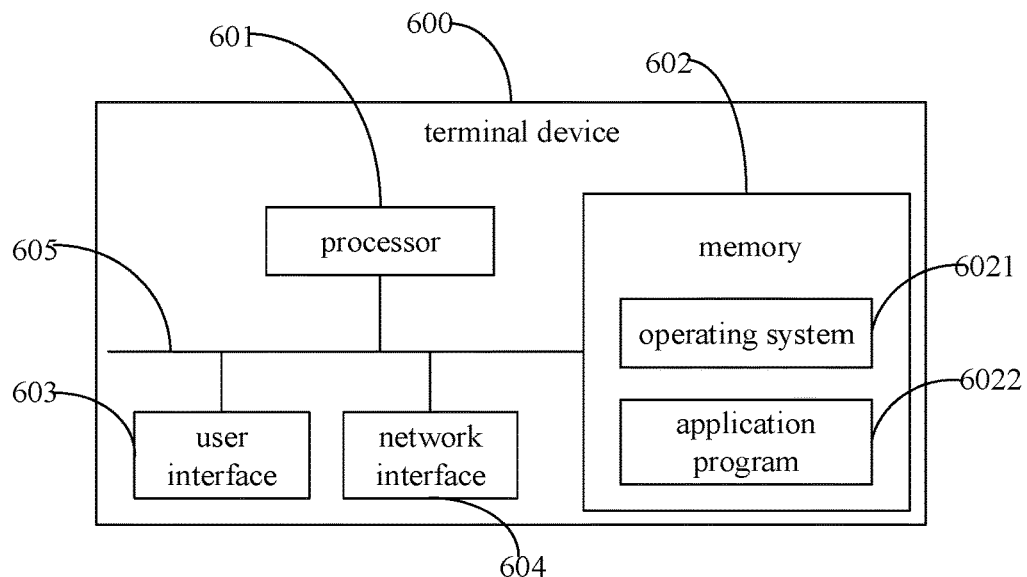
FIG. 6 is another schematic structural diagram of a terminal device provided by an embodiment of the present disclosure.

FIG. 6 is another schematic structural diagram of a terminal device provided by an embodiment of the present disclosure. The terminal device 600 shown in FIG. 6 includes: at least one processor 601, a memory 602, at least one network interface 604, and a user interface 603. The various components in the terminal device 600 are coupled together through the bus system 605. It can be understood that the bus system 605 is used to implement connection and communication between or among these components. In addition to the data bus, the bus system 605 includes a power bus, a control bus, and a status signal bus. However, for clarity of description, various buses are represented by the bus system 605 in FIG. 6.

The user interface 603 may include a display, a keyboard, or a pointing device (for example, a mouse, a trackball, a touch panel, a touch screen, and so on).

It may be understood that the memory 602 in the embodiments of the present disclosure may be a volatile memory or a non-volatile memory, or may include both the volatile memory and non-volatile memory. The non-volatile memory may be read-only memory (ROM, Read-Only Memory), programmable read-only memory (PROM, Programmable ROM), erasable programmable read-only memory (EPROM, Erasable PROM), electrically programmable read-only memory (EEPROM, Electrically EPROM) or flash memory. The volatile memory may be a random access memory (RAM), which is used as an external cache. By way of exemplary but not restrictive description, many forms of RAM are available, such as static random access memory (SRAM, Static RAM), dynamic random access memory (DRAM, Dynamic RAM), synchronous dynamic random access memory (SDRAM, Synchronous DRAM), double data rate synchronous dynamic random access memory (DDRSDRAM, Double Data Rate SDRAM), enhanced synchronous dynamic random access memory (ESDRAM, Enhanced SDRAM), synchronous connection dynamic random access memory (SLDRAM, Synchro link DRAM)), and direct Rambus random access memory (DR-RAM, Direct Rambus RAM). The memory 602 of the system and method described in the embodiments of the present disclosure is intended to include, but is not limited to, these and any other suitable types of memory.

In some embodiments, the memory 602 stores the following elements, an executable module or a data structure, or a subset thereof, or an extended set thereof: an operating system 6021 and an application program 6022.

The operating system 6021 includes various system programs, such as a framework layer, a core library layer, a driver layer, etc., which are used to implement various basic services and process hardware-based tasks. The application program 6022 includes various application programs, such as a media player, a browser, etc., which are used to implement various application services. The program for implementing the method in the embodiments of the present disclosure may be included in the application program 6022.

In an embodiment of the present disclosure, the terminal device 600 further includes: a computer program stored in the memory 602 and capable of running on the processor 601, and the computer program is executed by the processor 601 to implement the following steps: receiving configuration information, where the configuration information includes a plurality of pieces of uplink beam information for the uplink channel; and the plurality of pieces of uplink beam information has an association relationship with a related parameter of the uplink channel.

The methods disclosed in the foregoing embodiments of the present disclosure may be applied to the processor 601 or implemented by the processor 601. The processor 601 may be an integrated circuit chip with signal processing capability. In an implementation process, various steps of the foregoing method may be completed by a hardware integrated logic circuit in the processor 601 or instructions in the form of software. The aforementioned processor 601 may be a general-purpose processor, a digital signal processor (DSP), an application specific integrated circuit (ASIC), a field programmable gate array (FPGA) or other programmable logic devices, a discrete gate or a transistor logic device, or a discrete hardware component. The methods, steps, and logical block diagrams disclosed in the embodiments of the present disclosure may be implemented or executed. The general-purpose processor may be a microprocessor, or the processor may also be any conventional processor or the like. The steps of the method disclosed in the embodiments of the present disclosure may be directly embodied as being executed and completed by a hardware decoding processor, or executed and completed by a combination of hardware and software modules in the decoding processor. The software module may be located in a computer-readable storage medium that is mature in the field, such as random access memory, flash memory, read-only memory, programmable read-only memory, electrically erasable programmable memory, or register. The computer-readable storage medium is located in the memory 602, and the processor 601 reads information in the memory 602, and completes the steps of the foregoing method in combination with its hardware. Specifically, a computer program is stored on the computer-readable storage medium, and when the computer program is executed by the processor 601, each step of the method embodiments shown in FIG. 2 is implemented.

It can be understood that the embodiments described in the embodiments of the present disclosure may be implemented by hardware, software, firmware, middleware, microcode, or a combination thereof. For hardware implementation, the processing unit can be implemented in one or more application specific integrated circuits (ASIC), digital signal processor (DSP), digital signal processing device (DSPD), programmable logic device (PLD), Field-Programmable Gate Array (FPGA), general-purpose processor, controller, microcontroller, microprocessor, or other electronic units for performing the functions described in the present disclosure, or a combination thereof.

For software implementation, the technology described in the embodiments of the present disclosure may be implemented by modules (for example, procedure, function, etc.) that perform the functions described in the embodiments of the present disclosure. The software codes may be stored in the memory and executed by the processor. The memory may be implemented in the processor or external to the processor.

The terminal device 600 can implement various processes implemented by the terminal device in the foregoing method embodiments of FIG. 2. To avoid repetition, details are not described herein again.

An embodiment of the present disclosure further provides a computer-readable storage medium, and a program is stored on the computer-readable storage medium. The program is executed by a processor to implement various processes of the method embodiments of FIG. 2, and the same technical effect can be achieved, which will not be repeated herein, to avoid repetition. The computer-readable storage medium is, for example, a read-only memory (ROM), a random access memory (RAM), a magnetic disk or an optical disk, etc.

Figure 7:
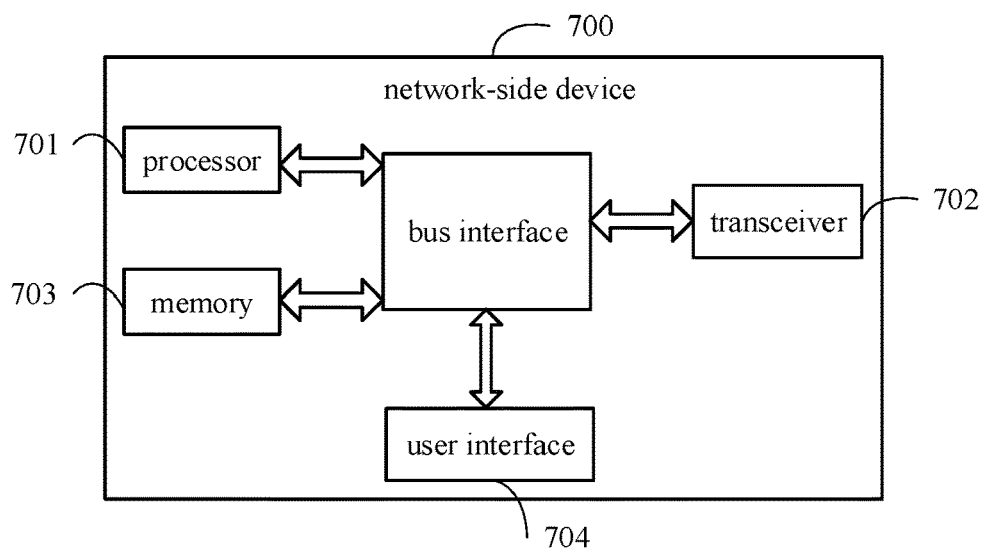
FIG. 7 is another schematic structural diagram of a network-side device provided by an embodiment of the present disclosure.

FIG. 7 is another schematic structural diagram of a network-side device provided by an embodiment of the present disclosure. The network-side device 700 shown in FIG. 7 can implement details of the method embodiments in FIG. 3 and achieve the same effects. As shown in FIG. 7, the network-side device 700 includes: a processor 701, a transceiver 702, a memory 703, a user interface 704, and a bus interface.

In an embodiment of the present disclosure, the network-side device 700 further includes: a computer program stored in the memory 703 and capable of running on the processor 701, and the computer program is executed by the processor 701 to implement the following steps: transmitting configuration information, where the configuration information includes a plurality of pieces of uplink beam information for the uplink channel; and the plurality of pieces of uplink beam information has an association relationship with a related parameter of the uplink channel.

In FIG. 7, the bus architecture may include any number of interconnected buses and bridges. Specifically, various circuits of one or more processors represented by the processor 701 and a memory represented by the memory 703 are linked together. The bus architecture may also link various other circuits such as peripheral devices, voltage regulators, power management circuits, etc., which are well-known in the art, and therefore, no further descriptions are provided herein. The bus interface provides an interface. The transceiver 702 may be a plurality of elements, that is, include a transmitter and a receiver, and provide a unit for communicating with various other devices on a transmission medium. For different user equipment, the user interface 704 may also be an interface capable of externally or internally connecting to required equipment. The connected equipment includes but not limited to a keypad, a display, a speaker, a microphone, a joystick, and the like.

The processor 701 is responsible for managing the bus architecture and general processing, and the memory 703 may store data used by the processor 701 when performing operations.

The network-side device 700 may implement each process implemented by the network-side device in the foregoing method embodiments of FIG. 3, and details are not described herein again, to avoid repetition.

An embodiment of the present disclosure further provides a computer-readable storage medium, and a computer program is stored on the computer-readable storage medium. When the computer program is executed by a processor, various processes of the method embodiments of FIG. 3 are implemented to achieve the same technical effects, which will not be repeated herein, in order to avoid repetition. The computer-readable storage medium is, for example, a read-only memory (ROM), a random access memory (RAM), a magnetic disk or an optical disk, etc.

It should be noted that in this specification, terms "include", "comprise" or any other variants thereof are intended to cover non-exclusive inclusion, so that a process, method, article or device including a series of elements not only includes those elements, but also includes other elements not explicitly listed, or elements inherent to the process, method, article, or device. Without more restrictions, an element defined by the sentence "including a . . . " does not exclude the existence of other identical elements in the process, method, article or device that includes the element.

Through the description of the above embodiments, those skilled in the art can clearly understand that the method of the above embodiments can be implemented by means of software plus a necessary general hardware platform, and can also implemented by hardware without doubt, and in many cases, the former is a better implementation. Based on this understanding, the technical solution of the present disclosure essentially or the part that contributes to the related technology can be embodied in the form of a software product. The computer software product is stored in a storage medium (such as ROM/RAM, magnetic disk, optical disk), which includes several instructions to make a terminal (which may be a mobile phone, a computer, a server, an air conditioner, or a network device, etc.) execute the method described in each of embodiments of the present disclosure.

The embodiments of the present disclosure are described above with reference to the accompanying drawings, but the present disclosure is not limited to the above-mentioned specific embodiments. The above-mentioned specific embodiments are only illustrative and not restrictive. Those of ordinary skill in the art can make many forms under the enlightenment of the present disclosure and without departing from the principle of the present disclosure and the protection scope of the claims, all of which shall fall within the protection scope of the present disclosure.

What is claimed is:

1. A method for transmitting an uplink channel via multi-beams, comprising:
receiving configuration information by a terminal, wherein the configuration information comprises a plurality of pieces of uplink beam information for the uplink channel; and the plurality of pieces of uplink beam information has an association relationship with a related parameter of the uplink channel,
wherein the receiving configuration information by the terminal comprises receiving downlink control information DCI by the terminal, wherein the DCI is used to indicate the configuration information,
the one uplink channel is one physical uplink shared channel PUSCH, and the DCI comprises at least one sounding reference signal resource indicator SRI signaling field, and a manner of the DCI indicating the configuration information comprises:
one SRI signaling field indicating a plurality of pieces of resource indication information, wherein each piece of resource indication information in the plurality of pieces of resource indication information indicates one piece of uplink beam information.

2. The method according to claim 1, wherein
the manner of the DCI indicating the configuration information further comprises:
a plurality of SRI signaling fields indicating a plurality of pieces of resource indication information, wherein each SRI signaling field in the plurality of SRI signaling fields indicates at least one piece of resource indication information, and each piece of resource indication information in the at least one piece of resource indication information indicates one piece of uplink beam information.

3. The method according to claim 2, wherein, before receiving the DCI by the terminal, the method further comprises:
receiving a radio resource control RRC signaling by the terminal, wherein the RRC signaling is used to configure spatial relation information (Spatial Relation) of the PUSCH or Spatial Relation of a sounding reference signal SRS resource.

4. The method according to claim 3, wherein a manner of the RRC signaling configuring the Spatial Relation of the PUSCH comprises at least one of following:
the RRC signaling comprising one piece of physical uplink shared channel spatial relation information (PUSCH-Spatial Relation Info), wherein the one piece of PUSCH-Spatial Relation Info comprises the plurality of pieces of resource indication information; and
the RRC signaling comprising a plurality of pieces of PUSCH-Spatial Relation Info, wherein each piece of PUSCH-Spatial Relation info in the plurality of pieces of PUSCH-Spatial Relation Info comprises at least one piece of resource indication information; or
wherein a mariner of the RRC signaling configuring the Spatial Relation of the SRS resource comprises at least one of following:
the RRC signaling configuring one piece of sounding reference signal spatial relation information (SRS-Spatial Relation Info) for each SRS resource, wherein the one piece of SRS-Spatial Relation Info comprises the plurality of pieces of resource indication information; and
the RRC signaling configuring a plurality of pieces of SRS-Spatial Relation Info for each SRS resource, wherein each piece of SRS-Spatial Relation Info in the plurality of pieces of SRS-Spatial Relation Info comprises at least one piece of resource indication information.

5. The method according to claim 2, wherein the resource indication information comprises at least one of following:
channel state information reference signal resource indicator CRI, synchronization signal block resource indicator SSBRI, and SRI.

6. The method according to claim 1, wherein the association relationship comprises at least one of following:
a, the plurality of pieces of uplink beam information are associated with different transport blocks TB in a same uplink channel;
b, the plurality of pieces of uplink beam information are associated with different layers or different antenna ports corresponding to a same uplink channel;
c, the plurality of pieces of uplink beam information are associated with parts of a same uplink channel that are transmitted at different times;
d, the plurality of pieces of uplink beam information are associated with different physical resource blocks PRBs in a same PTB bundle; and
e, the plurality of pieces of uplink beam information are associated with each repeated transmission of the one uplink channel.

7. The method according to claim 6, wherein;
in a case that the one uplink channel is one PUSCH, the association relationship comprises at least one of following: a, b, and c; and
in a case that the one uplink channel is one PUCCH, the association relationship comprises at least one of following: b, c, d, and e.

8. The method according to claim 6, further comprising:
according to one or more of the association relationships a, b, d, and e, transmitting the one uplink channel by simultaneously using the plurality of pieces of uplink beam information; or
according to one or more of the association relationships a, b, c, d, and e, transmitting the one uplink channel by using the plurality of pieces of uplink beam information in a preset beam usage sequence.

9. The method according to claim 8, further comprising:
determining a beam switching point.

10. The method according to claim 9, wherein the determining the beam switching point comprises:
determining the beam switching point according to a frequency hopping point that is configured by a network-side device or specified in a protocol; or
determining at least one beam switching point based on a configuration of a network-side device or a protocol provision.

11. A terminal device comprising; a memory, a processor, and a program stored on the memory and executable on the processor, wherein the processor is configured to execute the program to implement following steps:
receiving configuration information, wherein the configuration information comprises a plurality of pieces of uplink beam information for one uplink channel; and the plurality of pieces of uplink beam information has an association relationship with a related parameter of the one uplink channel,
wherein the receiving configuration information comprises receiving downlink control information DCI by the terminal, wherein the DCI is used to indicate the configuration information,
the one uplink channel is one physical uplink shared channel PUSCH, and the DCI comprises at least one sounding reference signal resource indicator SRI signaling field, and a manner of the DCI indicating the configuration information comprises:
one SRI signaling field indicating a plurality of pieces of resource indication information, wherein each piece of resource indication information in the plurality of pieces of resource indication information indicates one piece of uplink beam information.

12. The terminal device according to claim 11, wherein the manner of the DCI indicating the configuration information further comprises:
a plurality of SRI signaling fields indicating a plurality of pieces of resource indication information, wherein each SRI signaling field in the plurality of SRI signaling fields indicates at least one piece of resource indication information, and each piece of resource indication information in the at least one piece of resource indication information indicates one piece of uplink beam information.

13. The terminal device according to claim 12, wherein, before receiving the DCI, the processor is configured to execute the program to implement following steps:
receiving a radio resource control RRC signaling, wherein the RRC signaling is used to configure spatial relation information (Spatial Relation) of the PUSCH or Spatial Relation of a sounding reference signal SRS resource.

14. The terminal device according to claim 13, wherein a manner of the RRC signaling configuring the Spatial Relation of the PUSCH comprises at least one of following:
the RRC signaling comprising one piece of physical uplink shared channel spatial relation information (PUSCH-Spatial Relation Info), wherein the one piece of PUSCH-Spatial Relation Info comprises the plurality of pieces of resource indication information; and the RRC signaling comprising a plurality of pieces of PUSCH-Spatial Relation Info, wherein each piece of PUSCH-Spatial Relation Info in the plurality of pieces of PUSCH-Spatial Relation Info comprises at least one piece of resource indication information; or wherein a manner of the RRC signaling configuring the Spatial Relation of the SRS resource comprises at least one of following:

the RRC signaling configuring one piece of sounding reference signal spatial relation information (SRS-Spatial Relation Info) for each SRS resource, wherein the one piece of SRS-Spatial Relation info comprises the plurality of pieces of resource indication information; and the RRC signaling configuring a plurality of pieces of SRS-Spatial Relation Info for each SRS resource, wherein each piece of SRS-Spatial Relation Info in the plurality of pieces of SRS-Spatial Relation Info comprises at least one piece of resource indication information.

15. The terminal device according to claim 12, wherein the resource indication information comprises at least one of following:

channel state information reference signal resource indicator CRI, synchronization signal block resource indicator SSBRI, and SRI.

16. The terminal device according to claim 11, wherein the association relationship comprises at least one of following:

a, the plurality of pieces of uplink beam information are associated with different transport blocks TB in a same uplink channel;

b, the plurality of pieces of uplink beam information are associated with different layers or different antenna ports corresponding to a same uplink channel;

c, the plurality of pieces of uplink beam information are associated with parts of a same uplink channel that are transmitted at different times;

d, the plurality of pieces of uplink beam information are associated with different physical resource blocks PRBs in a same PRB bundle; and e, the plurality of pieces of uplink beam information are associated with each repeated transmission of the one uplink channel.

17. A network-side device comprising: a memory, a processor, and a program stored on the memory and executable on the processor, wherein the processor is configured to execute the program to implement following steps:

transmitting configuration information, wherein the configuration information comprises a plurality of pieces of uplink beam information for one uplink channel; and the plurality of pieces of uplink beam information has an association relationship with a related parameter of the one uplink channel, wherein the processor is further configured to transmit downlink control information DCI, wherein the DCI is used to indicate the configuration information, the one uplink channel is one physical uplink shared channel PUSCH, and the DCI comprises at least one sounding reference signal resource indicator SRI signaling field, and a manner of the DCI indication the configuration information comprises:

one SRI signaling field indication a plurality of pieces of resource indication information, wherein each piece of resource indication information in the plurality of pieces of resource indication information indicates one piece of uplink beam information.

18. The network-side device according to claim 17, wherein the manner of the DCI indicating the configuration information further comprises:

a plurality of SRI signaling fields indicating a plurality of pieces of resource indication information, wherein each SRI signaling field in the plurality of SRI signaling fields indicates at least one piece of resource indication information, and each piece of resource indication information in the at least one piece of resource indication information indicates one piece of uplink beam information.

19. The network-side device according to claim 18, wherein, before transmitting the DCI, the processor is configured to:

transmit an RRC signaling, Wherein the RRC signaling is used to configure Spatial Relation of a PUSCH or Spatial Relation of a SRS resource.

20. The network-side device according to claim 19, wherein a manner of the RRC signaling configuring the Spatial Relation of the PUSCH comprises at least one of following:

the RRC signaling comprising one piece of PUSCH-Spatial Relation Info, wherein the one piece of PUSCH-Spatial Relation Info comprises the plurality of pieces of resource indication information; and the RRC signaling comprising a plurality of pieces of PUSCH-Spatial Relation Info, wherein each piece of PUSCH-Spatial Relation Info in the plurality of pieces of PUSCH-Spatial Relation Info comprises at least one piece of resource indication information;

or, wherein a manner of the RRC signaling configuring the Spatial Relation of the SRS resource comprises at least one of following:

the RRC signaling configuring one piece of sounding reference signal spatial relation information (SRS-Spatial Relation Info) for each SRS resource, wherein the one piece of SRS-Spatial Relation Info comprises the plurality of pieces of resource indication information; and the RRC signaling configuring a plurality of pieces of SRS-Spatial Relation Info for each SRS resource, wherein each piece of SRS-Spatial Relation info in the plurality of pieces of SRS-Spatial Relation Info comprises at least one piece of resource indication information.

* * * * *